United States Patent [19]

Gu et al.

[11] Patent Number: 5,820,641
[45] Date of Patent: Oct. 13, 1998

[54] FLUID COOLED TRAP

[75] Inventors: Youfan Gu; Dana S. Hauschultz, both of Boulder, Colo.

[73] Assignee: MKS Instruments, Inc., Andover, Mass.

[21] Appl. No.: 599,622

[22] Filed: Feb. 9, 1996

[51] Int. Cl.$^6$ .................................................. B01D 53/26
[52] U.S. Cl. ........................ 55/269; 55/462; 55/DIG. 15; 95/288
[58] Field of Search ...................... 55/269, 463, DIG. 15, 55/267, 462; 62/55.5, 93; 422/168, 169; 96/218, 205, 193; 95/288

[56] References Cited

U.S. PATENT DOCUMENTS

| | | | |
|---|---|---|---|
| 1,350,576 | 8/1920 | Smith | 96/193 |
| 1,920,800 | 8/1933 | McCausland. | |
| 2,949,015 | 12/1960 | Fite | 55/269 |
| 3,483,980 | 12/1969 | Cochran et al. | 55/269 |
| 3,785,121 | 1/1974 | Phelps | 55/53 |
| 3,802,497 | 4/1974 | Kümmell et al. | 165/158 |
| 3,865,929 | 2/1975 | Ehlig | 423/488 |
| 3,910,347 | 10/1975 | Woebcke | 165/142 |
| 3,956,061 | 5/1976 | Young et al. | 159/48 |
| 3,969,486 | 7/1976 | Gordon et al. | 423/531 |
| 4,374,811 | 2/1983 | Karger et al. | 423/240 |
| 4,506,513 | 3/1985 | Max | 55/269 |
| 4,613,485 | 9/1986 | Parry et al. | 422/173 |
| 4,739,787 | 4/1988 | Stoltenberg | 137/14 |
| 5,048,601 | 9/1991 | Yamaguchi et al. | 165/140 |
| 5,141,714 | 8/1992 | Obuchi et al. | 422/174 |
| 5,161,605 | 11/1992 | Gutlhuber | 165/1 |
| 5,405,445 | 4/1995 | Kumada et al. | 118/719 |
| 5,422,081 | 6/1995 | Miyagi et al. | 422/170 |

FOREIGN PATENT DOCUMENTS

| | | |
|---|---|---|
| 1-218013 | 8/1989 | Japan. |
| 1-318231 | 12/1989 | Japan. |
| 2-25573 | 1/1990 | Japan. |
| 2-9408 | 1/1990 | Japan. |
| 2-59002 | 2/1990 | Japan. |
| 2-61067 | 3/1990 | Japan. |
| 2-1114-3 | 4/1990 | Japan. |
| 4150903 | 5/1992 | Japan. |
| SU709-182 | 4/1977 | Russian Federation ................. 55/269 |
| SU1296-231-A | 2/1985 | Russian Federation ................. 55/269 |
| SU1604-428-A | 10/1988 | Russian Federation ................. 55/269 |
| 555671 | 10/1943 | United Kingdom ..................... 55/269 |

OTHER PUBLICATIONS

"Foreline Traps," *Nor–Cal Products*, Nor–Cal Products, Inc., May 1990.

*Primary Examiner*—Jay H. Woo
*Assistant Examiner*—Robert Hopkins
*Attorney, Agent, or Firm*—Scott B. Allison; James R. Young; Chrisman Bynum & Johnson

[57] ABSTRACT

The liquid cooled trap for effectively and efficiently collecting condensable vapor in a chemical vapor reaction system includes two stages. The first stage includes an entrance area to the trap that is purposely designed to be large in space and a very poor heat exchanger in order to avoid condensation and resulting solid deposits that could clog the entrance port to the trap. The second stage comprises a better heat exchanger to spread the condensation and deposits efficiently over a larger surface area and a longer flow path. The second stage is a very efficient heat exchanger to clean up and remove whatever small amount of the condensable vapor remains after the first stage of the trap. The second stage includes cooling coil tubes and cooling cones or fins to increase the overall efficiency of the trap be increasing the interior surfaces upon which the flowing condensable vapor can condense, while not significantly reducing the flow conductance of the trap.

63 Claims, 11 Drawing Sheets

VAPOR PRESSURE CURVE FOR NH₄CL 5,820,641

FLUID COOLED TRAP

BACKGROUND OF THE INVENTION

1. Field the Invention

This invention relates generally to traps for collecting and removing condensable vapor from a gas stream and, more particularly, to a two-stage, liquid cooled trap device for condensing and removing ammonium chloride ($NH_4Cl$) or other condensable gases from flow lines downstream of chemical reaction chambers, such as chemical vapor deposition (CVD) and etching chambers.

2. Description of the Prior Art

The formation of gas byproducts is quite common in semiconductor and other manufacturing processes. For example, Low Pressure Chemical Vapor Deposition (LPCVD) and aluminum etching in semiconductor manufacturing processes generate chemical reaction byproducts, such as ammonium chloride gas ($NH_4Cl$) or aluminum chloride ($AlCl_3$) gas, in the effluent gas created in and discharged from reaction process chambers. Such ammonium chloride or aluminum chloride gases may condense, solidify, or deposit, and thereby cause solid buildup on cool surfaces, such as on the inside surfaces of unheated pipes used to convey the effluent gas away from the reaction chambers, in vacuum pumps, and in other equipment. Such solid buildup in pipes, pumps, and other equipment downstream from the reaction process chamber can partially or even entirely plug the pipes, damage the pumps and other equipment, reduce vacuum conductance, and render piping, pumps, and other equipment used in the manufacturing process functionally impaired or inoperative. Such solid buildup can also flake apart and fall off the piping surfaces and migrate back into the reaction process chamber to become a source of contamination in the manufacturing process. A Low Pressure Chemical Vapor Deposition (LPCVD) process for depositing a coating of silicon nitride as a mask or protective coating on substrate wafers used to form semiconductor chips, for example, produces large amounts of ammonium chloride gas as a byproduct in the reaction chamber where the silicon nitride deposition occurs, and solid buildup of the condensed ammonium chloride downstream of the chemical reactor or deposition chamber is a substantial problem. Ammonium chloride gas typically sublimates at a temperature of less than one hundred forty degrees celsius (140° C.) at 300 milliTorr. Once the ammonium chloride gas leaves the reaction chamber and cools down, sublimation of the ammonium chloride causes a white crystalline material to form and build up on all unheated surfaces, such as on the insides of pipes and pumps used in the manufacturing system. Also, as mentioned above, when such sublimated ammonium chloride flakes, breaks away, and flows back into the reaction chamber, it can contaminate the semiconductor substrate wafers in the reaction chamber and ruin or decrease the yield of useable semiconductor devices. Therefore, such contamination occurs, the manufacturing system must be shut down, while the crystalline material is cleaned out of the system, and the clogged pipes and pumps have to be cleaned or replaced. Such stoppages and ruined substrate wafers or semiconductor chips can and do cause substantial cost and expensive material loss and production losses in semiconductor manufacturing.

In order to prevent the ammonium chloride gas from clogging or contaminating the manufacturing system, it must be either prevented from condensing and solidifying or removed from the piping system being used in the manufacturing process. In a typical LPCVD Semiconductor manufacturing process, a vacuum pump is connected by piping to the outlet of the chemical reaction or deposition chamber to pull the chamber pressure down to the desired reaction pressure. The reaction gases are introduced through an inlet into the reaction chamber, where they chemically react in the vacuum to produce the material such as silicon nitride, that deposits on the semiconductor substrates in the chamber. The reaction by-products are drawn by the vacuum pump out of the chamber. In order to prevent sublimation or condensation of the gas byproducts in piping leading away from the reaction chamber outlet, heater jackets are usually wrapped around such piping to maintain it at an elevated temperature, thereby preventing condensation and solidification of the by product gases, such as ammonium chloride, on the inside surfaces of such piping. However, preventing condensation and buildup of the byproduct materials in the vacuum pump and other piping components is not so easy. Therefore, in some manufacturing systems, a trap is installed just after the heated section of the piping line for trapping condensable vapors and removing them from the gas flow before they reach the vacuum pump. Therefore, the condensable vapor is condensed and collected in the trap instead of in the piping line. The trap can then be removed from the piping line whenever necessary or convenient for cleaning and removal of the condensed gas byproducts. If the capacity of a trap is high enough so that the time period between required trap cleanings is longer than time period between normal system maintenance checks, the existence of the trap and the required trap cleanings are insignificant to the overall semiconductor manufacturing process.

The use of traps to remove condensable vapor from piping lines is already well-known in the art. Conventional traps for trapping condensable vapor are often designed on the principle that lowering the temperature of the condensable vapor in the trap will cause the condensable vapor to condense. Since the piping line is acting at a state of high vacuum (very low pressure), heat transfer between the molecules of condensable vapor and the interior surfaces of the trap is not usually efficient since the amount of heat transferred by conduction, convection, or radiation in the gas phase is quite small. A molecule of the condensable vapor can be cooled efficiently, however, if a direct collision occurs between the gas molecule and an interior surface of the trap. Therefore, some traps are designed so that the gas flow causes the condensable vapor to impact interior surfaces in the trap. For example, U.S. Pat. No. 5,422,081 issued to Miyagi et al. discloses a trap device for a vapor phase reaction apparatus having an adjustable number of interior surfaces upon which the condensable vapor can impact and condense. The Miyagi et al. invention, however, requires a plurality of plate-shaped members assembled in layers, which can be time consuming and difficult to manufacture and assemble. In addition, the large number of parts can make it difficult and time consuming to repair or disassemble the trap. The close proximity between the plate-shaped members and the intake opening can cause the trap to clog prematurely, thus wasting a significant portion of the trap's volume.

Nor-Cal, Inc., of Yreka, Calif., has developed and manufactured a number of water-cooled traps for semiconductor processing equipment, including traps having coaxial and right angle configurations between the entrance ports to the traps and the exit ports to the traps. In the FTWA and FTWS series of traps manufactured by Nor-Cal, Inc., baffles redirect the gas flow between cooling coil tubes arranged cylindrically to increase the surface area for condensation of the condensable vapor flowing through the trap. Gas flowing into the trap is redirected either ninety degrees or one-hundred eighty degrees by impacting either an interior surface of the trap or a cooling coil tube located in the trap. The Nor-Cal, Inc., traps, as well as many other conventional traps, become clogged near the entrance port to the trap, which results in low capacity and the need for frequent maintenance and cleaning. Consequently, in spite of the well-developed state of trap technology, there is still a need for a more efficient trap that can be installed in a piping line and which utilizes a more significant portion of the trap volume before the trap becomes clogged and requires cleaning.

SUMMARY OF THE INVENTION

Accordingly, it is a general object of this invention to provide a trap for removing condensable vapor flowing in piping segments used in semiconductor manufacturing processes.

It is another general object of this invention to provide a trap that has a high capacity and a high efficiency simultaneously.

It is a further general object of this invention to provide a trap that maintains a high level of flow conductance.

It is a specific object of this invention to provide a trap having a flow conductance at its exit that is approximately equal to the flow conductance at the trap's entrance.

It is still another general object of this invention to provide a trap that has a minimal amount of unused volume when the trap becomes clogged.

It is a specific object of this invention to provide a trap that does not clog prematurely at the entrance port to the trap.

It is a further specific object of this invention to provide a trap that fills a significant portion of the trap's volume with solidified condensation before cleaning of the trap is required.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, the trap apparatus comprises a hollow and generally cylindrical main housing having an entrance port extending outward from a front side of the main housing and an opening extending through an end of the main housing, a hollow and generally cylindrical sleeve having two open ends where the sleeve extends through the opening in the top of the main housing and partially toward the base flange of the main housing. The hollow sleeve is rigidly positioned such that one open end of the sleeve is positioned inside the hollow interior of the main housing and the other open end of the sleeve is positioned outside the main housing. In addition, the hollow sleeve is positioned off-center in the main housing near the back side of the housing diametrically opposed from the entrance port. A cooling coil tube through which liquid can flow is coiled into a cylindrical configuration and positioned inside the hollow sleeve. The cooling coil tube is attached to a cylindrical pipe that extends through the main housing and to a hollow center conduit that extends down the longitudinal center of the hollow sleeve and through the base flange of the main housing. A liquid can then flow into the housing through the cylindrical pipe, and the flow serially through the cooling coil tube and the hollow center tube before exiting the main housing through another cylindrical pipe connected to the hollow center tube and extending through the base flange of the main housing.

The trap preferably includes one or more perforated cones attached to the center tube in the hollow sleeve and positioned so as to make physical contact with the cooling coil tube. Each cone is preferably oriented with its smaller diameter neck closer to the top of the main housing than its wider diameter bottom, which is closer to the base flange of the main housing. Alternatively, fins can extended outward from the center conduit to form a plurality of spirals along the length of the center conduit.

An additional embodiment of the trap includes fins positioned vertically in the housing so that they extend radially inward. Another embodiment of the trap includes positioning the cooling coil tube so that a significant portion of the cooling coil tube is arranged as a conical frustum and positioned outside of the sleeve towards the base flange of the main housing.

Looking at the trap in a different perspective, the trap apparatus comprises two sequential stages with an entrance area and first stage that are purposely designed to be large in space and very poor heat exchangers in order to avoid condensation and resulting solid deposits that could accumulate and clog the entrance, followed by a second stage comprising more impact surface area in the flow path of the gas to achieve a better heat exchanger to spread the condensation and deposits efficiently over a larger surface area and a longer flow path. The second stage is a very efficient heat exchanger to clean up and remove whatever small amount of the condensable vapor remains after the first stage of the trap. Additional optional stages or transition areas between stages can be created to further improve the efficiency of the trap and increase the capacity of the trap.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings

DETAILED DESCRIPTION OF THE PREFERRED EMBODIMENTS

Figure 1:
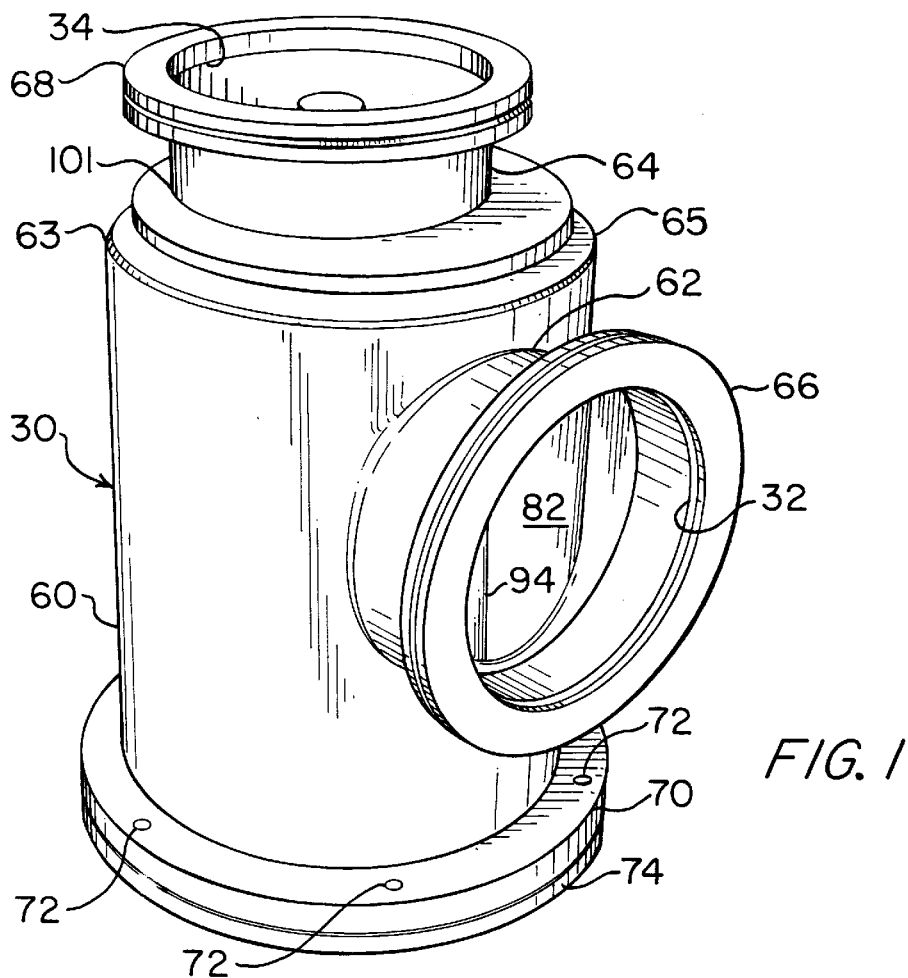
FIG. 1 is an isometric view of the trap of the present invention.

A liquid cooled trap 30 according to the present invention for use in condensing and trapping byproduct condensable gases, such as ammonium chloride, in semiconductor manufacturing processes is illustrated in FIG. 1. The trap 30 includes an entrance port or inlet 32 for connecting the trap 30 to a piping line segment or pipe 46 (shown in FIG. 2) to allow flowing gas to enter the trap 30 and an exit port or outlet 34 for connecting the trap to a different piping line segment or pipe 54 (shown in FIG. 2) to allow the flowing gas that enters the trap 30 through the entrance port 32 to exit the trap 30 after the condensable vapor has been removed from the flowing gas, as will be discussed in more detail below.

Figure 2:
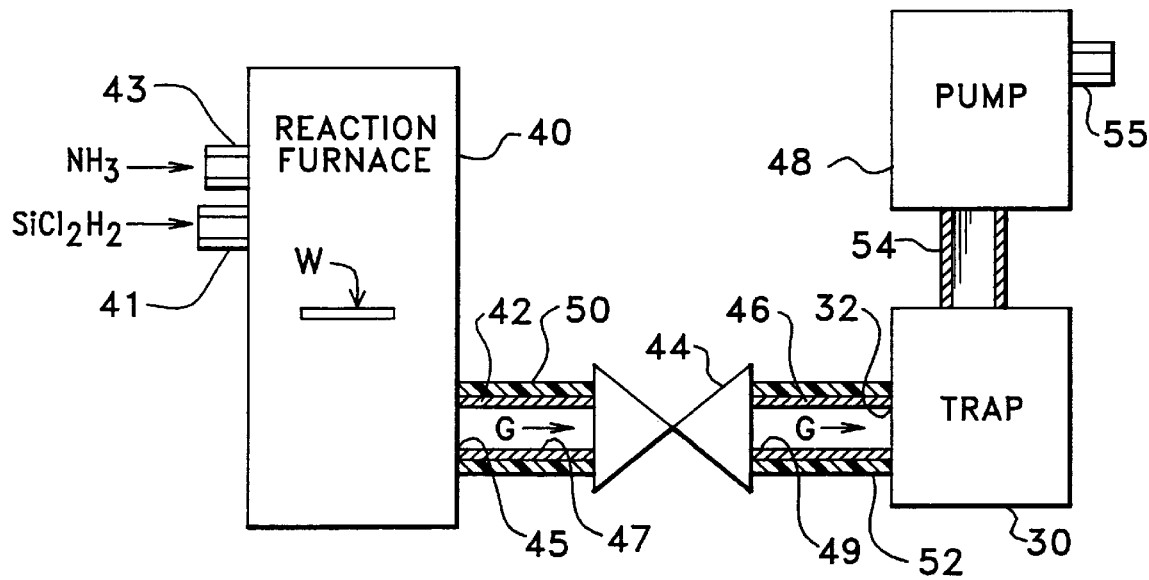
FIG. 2 is a representative diagrammatic block view of a typical semiconductor manufacturing system showing a reaction furnace, a valve, the trap of FIG. 1, a vacuum pump, cross sections of the piping connecting the outlet of the reaction furnace to the valve, the valve to the trap, and the trap to the vacuum pump, and cross sections of the heaters on the piping that connect the reaction furnace to the valve and the valve to the trap.

A representative diagrammical block view of a portion of a semiconductor manufacturing process is shown in FIG. 2. In a typical semiconductor manufacturing example, it is often desirable to deposit silicon nitride ($Si_3N_4$) on silicon chip wafers W as a dielectric film or a resist for an etching process. To do so, the wafer W to be coated is positioned in a reaction chamber or furnace 40, and reaction gases, such as $SiCl_2H_2$ (dichlorosilane) and $NH_3$ (ammonia), are pumped into the reaction furnace 40 through inlets 41 and 43. The reaction gases $SiCl_2H_2$ and $NH_3$ react together in the reaction chamber 40 to form the $Si_3N_4$, which deposits on the wafer W, and the gas byproducts, $NH_4Cl$ (ammonium chloride) and $H_2$ (hydrogen). These $NH_4Cl$ and $H_2$ gas byproducts (collectively indicated as G in FIG. 2) exit the reaction furnace 40 through a chamber outlet 45 and flow into the first line segment or pipe 42. The chemical reaction that occurs inside the reaction chamber 40 in this example manufacturing process is illustrated by the following:

$$10NH_3 + 3SiCl_2H_2 \rightarrow Si_3N_4 + 6NH_4Cl + 6H_2 \qquad (1)$$

The gas byproducts G ($NH_4Cl$ and $H_2$) exit the reaction furnace 40 through the piping line segment 42, as mentioned above, and flow through a valve 44, which may be provided to control the gas flow rate, and then through piping line segment or pipe 46 to the inlet port 32 of the trap 30.

The gas byproducts G begin to decrease in temperature after they leave the reaction furnace 40 and, as a result, the ammonium chloride ($NH_4Cl$) in the gas byproducts G tends to sublimate, solidify, and deposit along the inside surfaces 47, 49 of the piping line segments or pipes 42, 46, respectively. If such deposition of $NH_4Cl$ in the pipes 42, 46 was allowed to continue unimpeded, it would cause the piping line segments or pipes 42, 46 to clog and thereby reduce vacuum conductance, damage the piping line segments 42, 46, and possibly damage the vacuum pump 48. To prevent the ammonium chloride ($NH_4Cl$) in the gas byproducts G from clogging the piping line segments 42, 46, insulators or heaters 50, 52 are usually placed around the piping line segments 42, 46, respectively, to keep the temperature in the piping line segments 42, 46 elevated and thereby prevent the ammonium chloride ($NH_4Cl$) from cooling, condensing, solidifying, and accumulating until the gas byproducts G reach the trap 30. Such condensation and solidification can also occur in the valve 44 as well as in other piping components, so it is not unusual to also keep them heated as well. Through the use of the heater 52, therefore, it is possible to control the temperature of the gas byproducts G as they enter the trap 30 at the entrance port 32 to the trap 30 and, since the heater 52 abuts the entrance port 32 to the trap 30, the heater 52 can also be used to help control the temperature of the entrance port 32 to the trap 30. Similarly, a heater (not shown) could be placed on the piping line segment 54 to control the temperature of the gas byproducts G exiting the trap 30 through the exit port 34 and, if such heater (not shown) abutted the exit port 34 of the trap 30, the heater (not shown) could be used to control the temperature of the exit port 34 of the trap 30. Controlling the temperature at the exit port 34 of the trap 30 can be useful when, for example, it is desired to prevent any accumulation of the condensed material in the gas byproducts G at the exit port 34 of the trap 30.

Solid ammonium chloride ($NH_4Cl$) in the vacuum pump 48 could cause the vacuum pump 48 to also become clogged and worn, which could be seriously and expensively detrimental to the vacuum pump 48. Therefore, the trap 30 is preferably positioned between the reaction furnace 40 and the vacuum pump 48 to cool the gas byproducts G created by the reaction furnace 40 and to condense, solidify, and collect the ammonium chloride ($NH_4Cl$) before either gaseous $NH_4Cl$ or the condensed and solidified particles of ammonium chloride ($NH_4Cl$) can reach and enter the vacuum pump 48. When the condensable vapor in the gas byproducts G, such as the $NH_4Cl$ in the example described above, are cooled and collected in the trap 30, there is no need to have an insulator or heater around the piping line segment 54 that leads from the trap 30 to the vacuum pump 48.

The significant advancements created by the trap 30 of the present invention are primarily due to the recognition that the deposition profile of the condensable vapor in the gas byproducts G in the trap 30 is determined, in large part, by the temperature profile across the trap 30 and the physical geometry of the trap 30 itself. That is, the amount and location of cooling and collection of condensable vapor from the gas byproducts G within the trap 30 is largely controlled by the temperatures within the trap 30, which may vary significantly in the trap 30 (thereby creating the temperature profile of the trap 30), and the size and shape (physical geometry) of the trap 30. In fact, the deposition profile of the trap 30 can be varied by varying either the temperature profile of the trap 30, the physical geometry of the trap 30, or both, as will now be discussed in further detail.

Figures 3A, 3B:
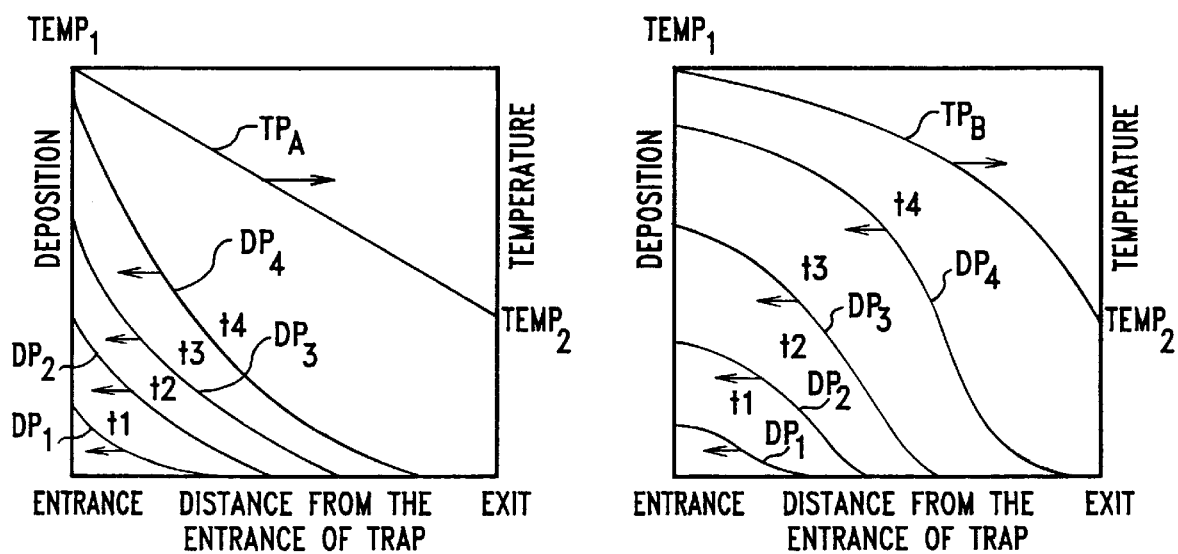
FIG. 3 shows deposition profiles for a hypothetical trap having varying temperature profiles.
Figure 3C:
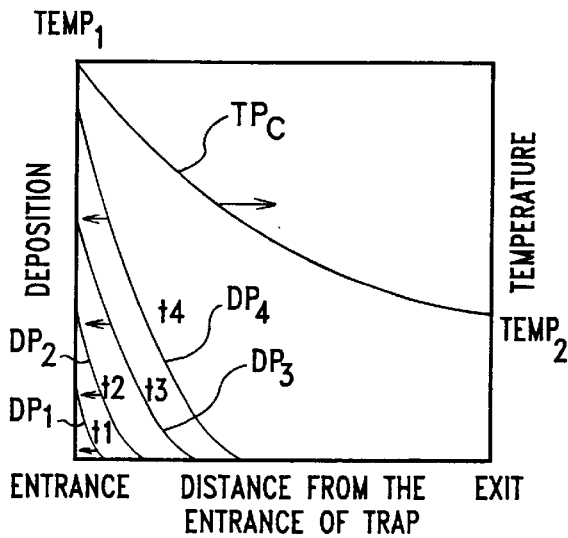
Figure 3D:
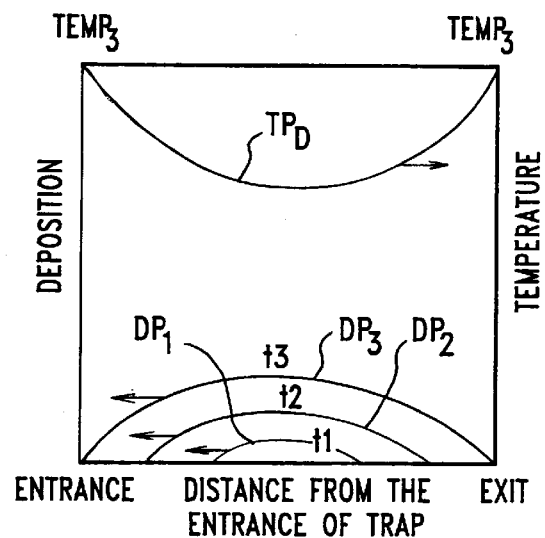
Figure 4A:
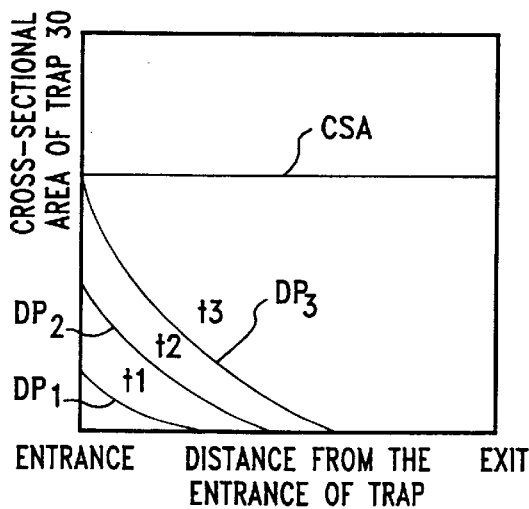
FIG. 4 shows deposition profiles for a hypothetical trap having varying physical geometries.
Figure 4B:
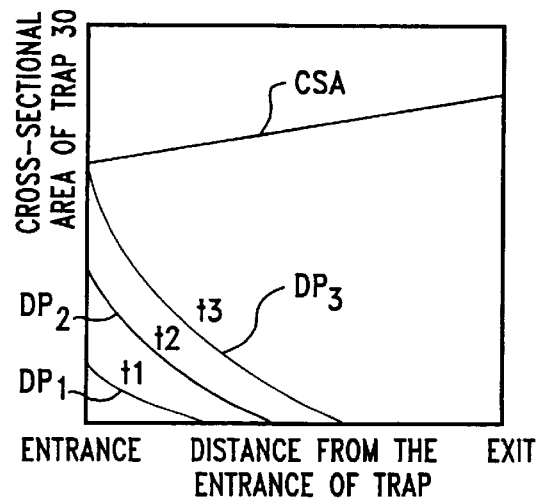
Figure 4C:
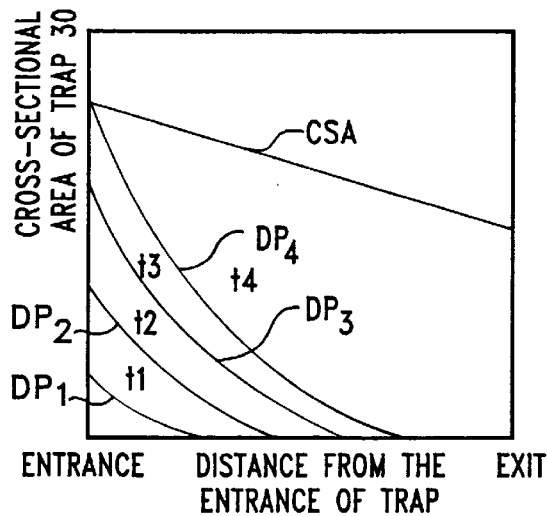
Figure 4D:
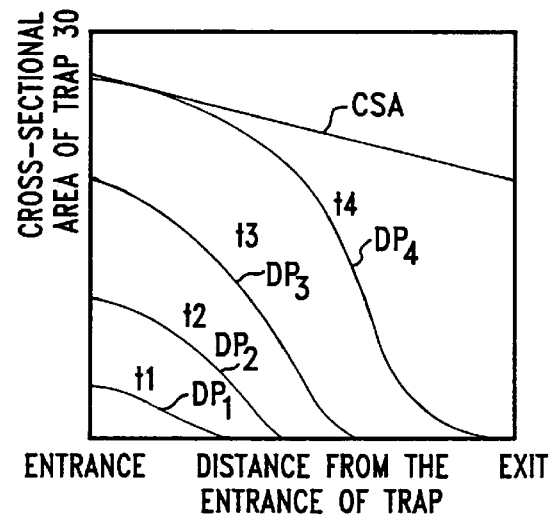

In order to cause the condensable vapor in the gas byproducts to condense inside the trap 30, the trap 30 must lower the temperature of the condensable vapor in the gas byproducts G, as will be discussed in more detail below. Therefore, the trap 30 is acting as a heat exchanger where heat is transferred from the condensable vapor in the gas byproducts G to the trap 30. Decreasing the temperature of the condensable vapor in the gas byproducts G will increase the cooling and collection of the condensable vapor in the gas byproducts G. Therefore, controlling the temperature profile of the trap 30 and, therefore, the temperature of the gas byproducts G flowing within the trap 30 has a significant impact on the cooling and collection of the condensable vapor in the gas byproducts G. For example, now referring to FIG. 3, graph (A), if the temperature of a hypothetical trap at the entrance of the trap is $TEMP_1$, the temperature of the trap at the exit of the trap is $TEMP_2$, and the temperature drops linearly through the trap from $TEMP_1$ to $TEMP_2$ as shown by the temperature profile $TP_A$, the cooling and collection of the condensable vapor in the gas byproducts G in the trap will create a deposition profile $DP_1$ at time $t_1$. $TEMP_1$ can be, for example, one hundred degrees celsius (100° C.) and $TEMP_2$ can be, for example, forty degrees celsius (40° C.). Over time, the continued cooling and collection of the condensable vapor in the gas byproducts G will grow so as to generate the deposition profile $DP_2$ at time $t_2$, the deposition profile $DP_3$ at time $t_3$, and the deposition profile $DP_4$ at time $t_4$. Given the temperature profile $TP_A$ across the trap, a significant majority of the deposition of the condensable vapor in the gas byproducts G will cool and collect at the entrance to the trap since the initial temperature drop in the trap occurs at the entrance to the trap. Changing the temperature profile across the trap, however, will change the resulting deposition curves $DP_1$, $DP_2$, $DP_3$, and $DP_4$ for the time periods $t_1$, $t_2$, $t_3$, and $t_4$, respectively, as shown in FIG. 3, graphs (B)–(D). $TEMP_3$ in FIG. 3, graph (D) can have a value of, for example, one hundred fifty degrees celsius (150° C.). Therefore, it is possible to produce an optimal or near optimal deposition profile for a trap by controlling the temperature profile of the trap.

In addition to controlling the temperature profile of a trap, it is also possible to control the physical geometry of a trap so as control the deposition profile and the amount of deposition within the trap. For example, now referring to FIG. 4, graph (A), the cross-sectional area for a hypothetical trap is shown as line CSA. In this example, the cross-sectional area CSA for the trap is constant at all points between the entrance to the trap and the exit of the trap. Assuming that the trap has a temperature profile equal to $TP_A$ in FIG. 3, graph (A), the entrance to the trap will become clogged at time $t_3$ when the condensed and accumulated condensable vapor in the gas byproducts G accumulates to the point that the entire cross-sectional area at the entrance is covered. Even if the trap has the cross-sectional area CSA shown in FIG. 4, graph (B), wherein the cross-sectional area of the trap increases between the entrance to the trap and the exit of the trap 30, the trap will still clog at time $t_3$. If, however, the trap has a cross-sectional area CSA between the entrance to the trap and the exit of the trap corresponding to FIG. 4, graph (C), the trap will not become clogged until the time $t_4$ due to the increased cross-sectional area of the trap near the entrance to the trap. The deposition of the condensed vapor within the trap can be further improved if the trap has a temperature profile $TP_B$ corresponding to FIG. 3, graph (B), as shown in FIG. 4, graph (D). While the hypothetical trap in this example still becomes clogged at time $t_4$, more of the usable volume in the trap is filled before the trap becomes clogged, thereby increasing the capacity of the trap in comparison to the trap described above in conjunction with FIG. 4, graphs (A)–(C). It is apparent, however, that significant portions of the traps represented by FIG. 4, graphs (A)–(D), will remain unused and wasted, thereby reducing the capacity of the trap. It is important to note that it may not always be desirable to operate the trap to the point of clogging since the flow of the gas byproducts G through the trap and the flow conductance of the trap will necessarily decrease significantly before the trap clogs. In other words, it may be desirable to clean the trap when the flow conductance of the trap is reduced by the accumulation of condensed material to a predetermined level. The predetermined level of reduced flow conductance of the trap will necessarily and always occur before the trap becomes clogged. Flow conductance is measured in volume-per-time and can be measured in, for example, liters-per-second.

Figure 5A:
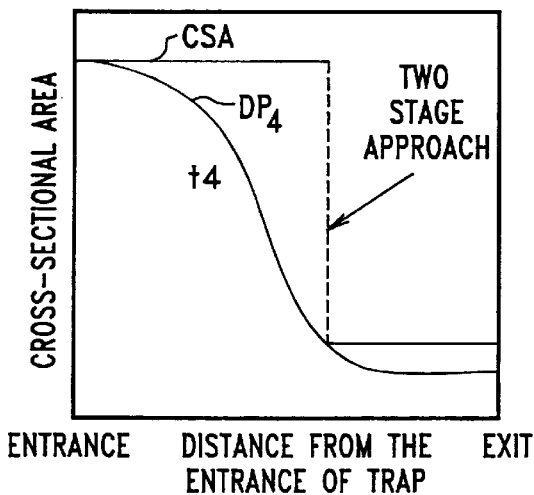
FIG. 5 shows deposition profiles for hypothetical traps having multiple stages.
Figure 5B:
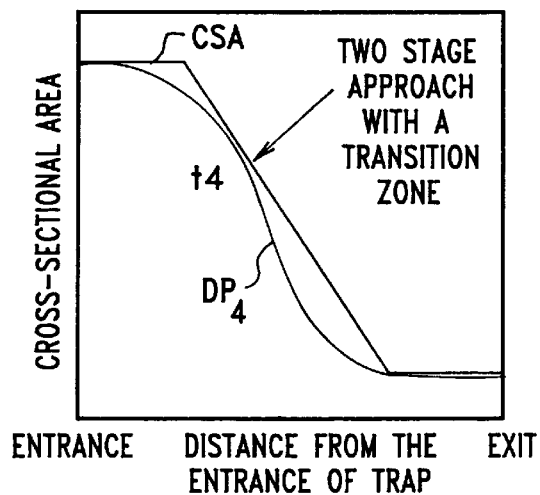
Figure 5C:
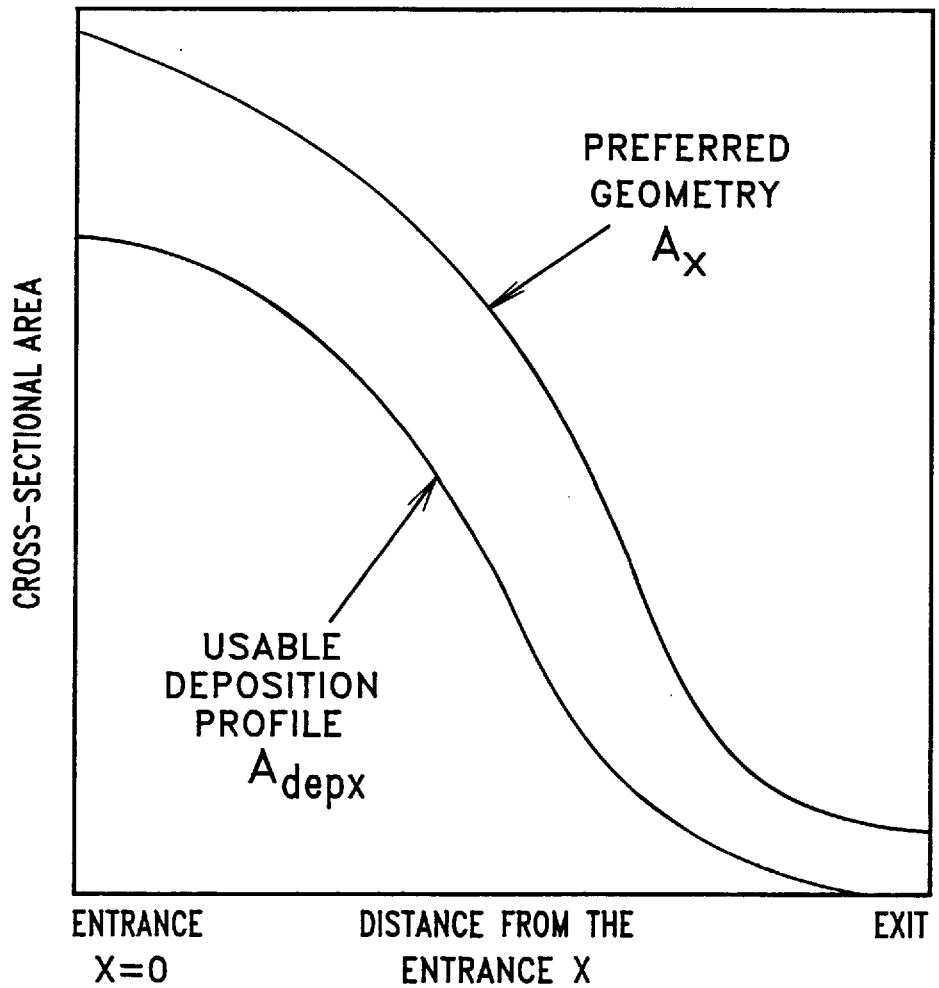

Since, given enough time, all traps will eventually clog, regardless of how big the trap is or how big the outer dimensions of the trap are, the recognition that controlling the temperature profile of the trap along with the geometry of the trap allows the creation of optimal or near optimal deposition profiles in the trap, creates the possibility of allowing a trap to be designed to maximize its usable volume, thereby maximizing the capacity of the trap, for a given set of outer dimensions of the trap. That is, controlling the temperature profile of the trap in conjunction with creating a specific trap geometry, allows the construction of a trap that maintains a high flow conductance while maximizing the usable volume and capacity of the trap and minimizing the unused portion of the trap. For example, given a temperature profile approximately equal to the temperature profile $TP_B$ in FIG. 3, graph (B), hypothetically, a trap having the characteristics shown in FIG. 5, graph (A), can be obtained. While similar to a trap having the characteristics shown in FIG. 4, graph (D), the trap having the characteristics shown in FIG. 5, graph (A), is essentially a two stage trap having a significantly smaller cross-sectional area at the exit to the trap than it has at the entrance to the trap. Since the deposition of condensable vapor is greatly reduced toward the exit of the trap in relation to the entrance port of the trap, the trap still does not clog until the time $t_4$. Significantly less usable volume of the trap is wasted, however, thereby increasing the trap's capacity while potentially requiring less material for the trap and reducing the outer dimensions of the trap, which can significantly reduce the cost and weight of the trap. A trap having the characteristics shown in FIG. 5, graph (A) still contains wasted usable volume and capacity, however, which can be reduced further by creating a third stage or transition zone between the first stage and the second stage, as shown in FIG. 5, graph (B). A trap having the characteristics shown in FIG. 5, graph (B) is closely tailored to the deposition profile in the trap so that relatively little of the available volume in the trap is unused when the trap becomes clogged, or when the flow conductance of the trap is reduced to a predetermined level, and so that the cross-sectional area CSA of the trap closely approximates the build-up of the deposition curve over time. In addition, when a trap having the characteristics shown in FIG. 5, graph (B), becomes clogged, the clogging occurs approximately simultaneously near the entrance to the trap, in the transition zone, and in the second stage of the trap.

As shown by these examples, therefore, it is theoretically possible to design a trap having multiple (perhaps infinite)

stages or transition zones so that the cross-sectional area of the trap at any point in the trap is optimized so that the trap clogs simultaneously at all points within the trap and so that none of the available volume of the trap is unused when the trap becomes clogged or when the flow conductance of the trap is reduced to a predetermined level. It should be noted that it may be extremely difficult to determine where one stage or zone ends and another stage or zone begins in a specific trap. It is important to recognize, however, that the concept of designing a trap having a predetermined temperature profile and a predetermined physical geometry that maintains a high flow conductance through the trap, maximizes the capacity of the trap, and minimizes the wasted volume of the trap, is not dependent on having a fixed number of stages or zones. In fact, the trap 30 of the present invention could be considered to comprise a single stage or zone that has a cross-sectional area and temperature profile that changes between the entrance port 32 to the trap 30 and the exit port 34 of the trap 30 so as to obtain the desired advantages discussed above. Therefore, the scope of the present invention should not be limited to a trap having a fixed and easily discernable number of stages or zones and should include traps wherein the temperature and/or physical geometry of the trap is specifically changed and designed, respectively, to achieve the benefits of high flow conductance, high efficiency, high capacity, minimal unused volume, and wherein the flow conductance of the trap 30 at the exit port 34 of the trap 30 is approximately equal to the flow conductance of the trap at the entrance port 32 to the trap 30. More specifically, the trap 30 of the present invention preferably has a flow conductance at the exit port 34 of the trap 30 that is at least as much as the flow conductance of the trap 30 at the entrance port 32.

A significant feature of the trap 30 of the present invention is the use of the temperature profile of the trap 30 along with the physical geometry of the trap 30 so that the trap 30 maintains a high flow conductance while maximizing the usable volume of the trap 30 and minimizing the unused volume of the trap 30. In addition, the flow conductance of the trap 30 at the entrance port 32 is approximately equal to the flow conductance of the trap 30 at the exit port 34 since there is only a small pressure drop between the entrance port 32 to the trap 30 and the exit port 34 of the trap 30. In the preferred embodiment of the present invention, the area of the entrance port 32 to the trap 30 is purposely designed to be a very poor heat exchanger in order to prevent condensation and resulting solid deposits from accumulating and clogging the entrance port 32 to the trap 30, which would reduce the capacity and usable volume of the trap 30. Entrance of the gas byproducts G through the port 32 is followed by sequential stages of increasingly better heat exchanger efficiency to spread the condensation and deposits over more of the surface areas along the flow paths in the trap 30 in order to maximize the capacity of the trap 30. The final stage of the trap 30 is a very efficient heat exchanger to clean up and remove whatever small amount of the condensable gas still remains in the gas G before the noncondensable portions of the gas byproducts G, which in the example described above is harmless gaseous hydrogen ($H_2$), exit the trap 30 through the exit port 34 and enter the piping line segment 54, where they flow to the vacuum pump 48 and are exhausted through exhaust port 55. Since the amount of heat exchange between the molecules of condensable vapor in the gas byproducts G and the trap 30 is largely dependent on the physical impact or collision of the molecules onto interior surfaces of the trap 30, the number of interior surfaces in the first stage of the trap 30 upon which the flowing gas byproducts G can directly impact or impinge is limited, particularly in comparison with the number of interior surfaces in the second stage of the trap 30 upon which the flowing gas byproducts G can directly impact or impinge, as will be discussed in more detail below.

In general, the trap 30 of the present invention will preferably comprise at least two stages, although more stages and transition areas between stages can also be used. A majority (approximately ninety-five percent (95%)) of the condensable vapor in the gas byproducts G will be collected or trapped in the first or primary removal stage of the trap 30, where a large trapping volume is provided away from the inlet port 32. The remaining (approximately five percent (5%)) condensable vapor in the gas byproducts G will be trapped and collected in the second or scrubber stage of the trap 30, where a highly efficient cooling mechanism is provided to maximize molecular contact with the trap 30 for maximizing heat exchange and thereby cooling and condensing condensable components of the gas byproducts G, as will be described in more detail below. Since the condensable vapor in the gas byproducts G will condense if a "cold" spot is encountered in the trap 30, cooling of the gas byproducts G in the first stage of the trap 30 is minimized so that the trap 30 does not become clogged in or near the entrance port 32 to the trap 30 and so that the trapping volume of the trap 30 near the entrance port 32 to the trap 30 is maximized. These benefits can be accomplished by keeping the volume $V_1$ of the first stage of the trap 30 much larger than the volume $V_2$ of the second stage of the trap 30 and by an off-center arrangement of the two stages of the trap 30, as will be discussed in more detail below. For example, the relationship between $V_1$ and $V_2$ should be:

$$\frac{V_1}{V_2} > \frac{1}{1} \tag{2}$$

and, preferably:

$$\frac{V_1}{V_2} > \frac{3}{2} \tag{3}$$

As will be discussed in more detail below, the capacity of the trap 30 is primarily dependent on the first stage of the trap 30 while the flow conductance of the trap 30 is primarily dependent on the second stage of the trap 30.

Figure 6:
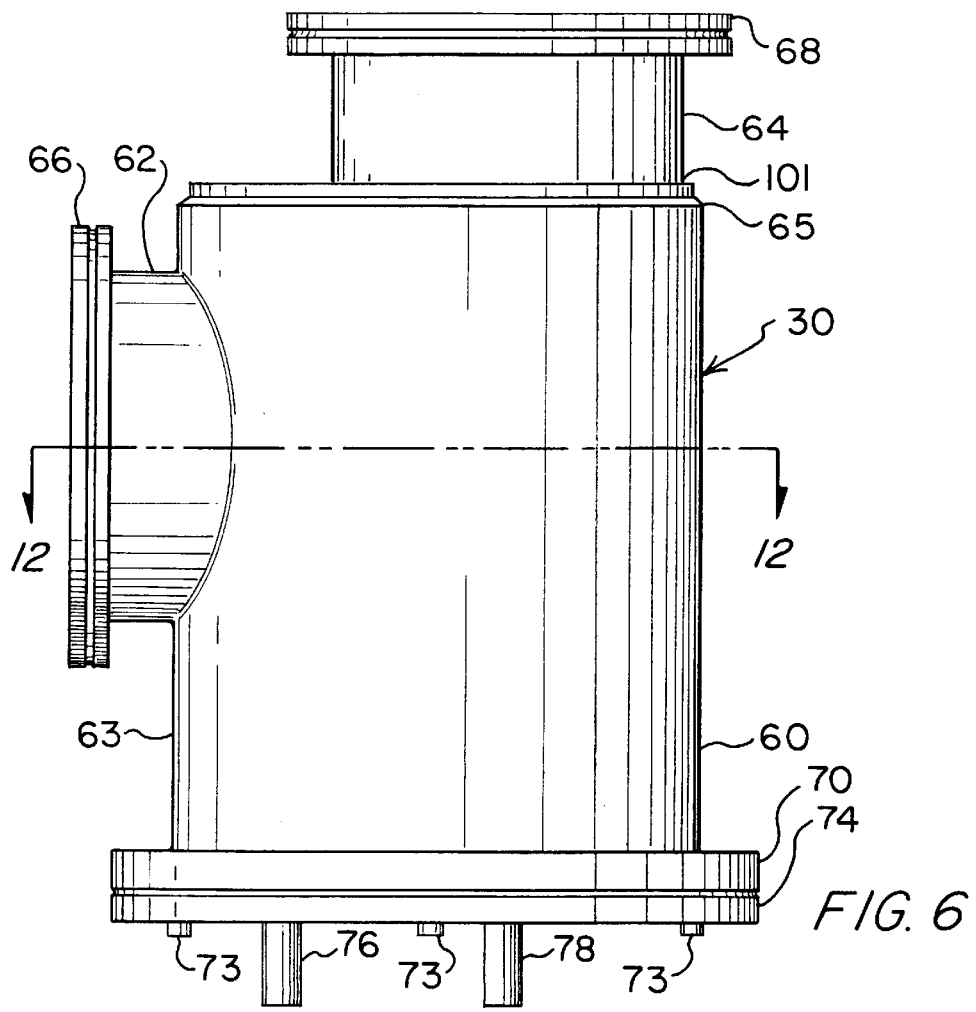
FIG. 6 is a right side elevation view of the trap of FIG. 1.
Figure 12:
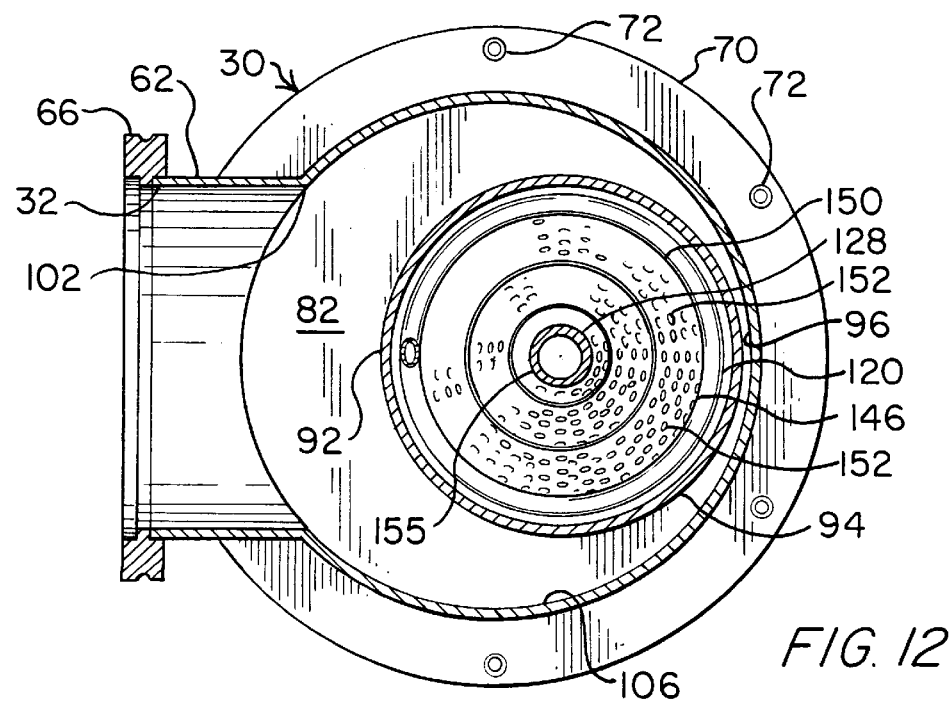
FIG. 12 is a cross-sectional view of the trap of FIG. 1, taken along the line 12—12 of FIG. 6.

Referring now to FIGS. 1 and 6, the trap 30 of this invention preferably has a generally cylindrical and hermetically sealed main housing 60. A cylindrical-shaped entrance port extension 62 extends radially outward from the outside side surface 63 of the main housing 60 and is terminated by an entrance port flange 66, which is used to connect the entrance port 32 of the trap 30 to a piping line segment, such as the piping line segment or pipe 46 shown in FIG. 2. A cylindrical-shaped exit port extension 64 extends axially upward from the top surface 65 of the main housing 60 and is terminated by the exit port flange 68, which is used to connect the exit port 34 of the trap 30 to a piping line segment, such as the piping line segment or pipe 54 shown in FIG. 2. The use of the flanges 66, 68 to connect the trap 30 to piping line segments in a vacuum-tight seal is well-known to persons having ordinary skill in the art and does not need any further discussion for purposes of explaining the structure and operation of the trap 30 of the present invention. As previously discussed, the heater 52 can be used to control the temperature of the gas byproducts G as the gas byproducts G enter the trap 30 at the entrance port 32 to the trap 30 and, since the heater 52 abuts the entrance port 32 to the trap 30, the heater 52 can also be used to help control the temperature of the entrance port 32 to the trap 30. Similarly, a heater (not shown) could be placed on the piping line segment 54 to control the temperature of the gas byproducts G exiting the trap 30 through the exit port 34 and, if such heater (not shown) abutted the exit port 34 of the trap 30, the heater (not shown) could be used to control the temperature of the exit port 34 of the trap 30. Other optional heaters (not shown) surrounding and covering the entrance port extension 62, exit port extension 64, flange 66, or flange 68 can also be used to control the temperature of the gas byproducts G entering and exiting the trap 30 and the temperature of the trap 30 at the entrance port 32, the exit port 34, the entrance port extension 62, the exit port extension 64, the flange 66, or the flange 68 so as to help obtain a desired temperature profile across the trap 30.

The base of the main housing 60 has larger diameter flange 70 than the main housing 60 and includes threaded or unthreaded holes 72 so that the removable base plate 74 can be tightly attached with the bolts 73 or other suitable fasteners to the main housing 60 during use of the trap 30 and so that the base plate 74 can be removed from the main housing 60 for cleaning and repair of the interior area of the trap 30, as will be discussed in more detail below. The O-ring 75 is positioned between the base flange 70 and the base plate 74 and provides a tight, hermetic seal when the base plate 74 is attached to the base flange 70. The cylindrical tubes 76, 78 extending downward from the bottom of the trap 30 though the base flange 70 and the base plate 74 are conduits for circulating a flowing liquid, such as cooling water, through the interior of the trap 30, as will also be described in more detail below.

For purposes of explanation, but not limitation, of the structure and operation of the trap 30 of the present invention, the main housing 60 can have an outer diameter of approximately six inches, a wall thickness of approximately $85/1000$ of an inch, and an inner height 61 (see FIG. 9) of approximately seven to eight inches. The entrance port extension 62 and the exit port extension 64 can both have an outer diameter of approximately four inches, an inner diameter of approximately 3.87 inches, and a wall thickness of approximately $65/1000$ of an inch.

As previously discussed above, it is important that the gas byproducts G entering the trap 30 do not condense, solidify, or accumulate in the trap 30 such that the entrance port 32 or the entrance port extension 62 become clogged prematurely. Therefore, it is important to distribute condensation of the material within the trap 30 so that an optimal amount of the volume of the trap 30 is filled before cleaning is required or before the trap 30 becomes clogged. In other words, it is important to create a deposition profile in the trap 30 so that the trap 30 does not clog prematurely at the entrance port 32 or in the entrance port extension 62.

The condensation process of the condensable gas byproducts G in the trap 30 is a phase change process. The condensable gas byproducts G change from the vapor or gaseous phase to the solid phase as the gas byproducts G flow through the trap 30. A condensable vapor or gas in a gas stream will condense when its partial pressure in the vapor phase is greater that the equilibrium vapor pressure. More specifically, the partial pressures for a gas are the pressures for each component in a mixture of gas. Therefore, for a gas with gas byproducts G comprising ammonium chloride ($NH_4Cl$) and hydrogen ($H_2$), each of the two components, ammonium chloride ($NH_4Cl$) and hydrogen ($H_2$), has its own partial pressure. The total pressure of the gas comprising the mixture of the two components, ammonium chloride ($NH_4Cl$) and hydrogen ($H_2$), is equal to the sum of the partial pressures of the two components ammonium chloride ($NH_4Cl$) and hydrogen ($H_2$). The equilibrium vapor pressure for ammonium chloride ($NH_4Cl$) is the pressure at which the rate of condensation of the ammonium chloride ($NH_4Cl$) from a vapor to a solid is equal to the rate of evaporation or vaporization of the ammonium chloride ($NH_4Cl$) from a solid to a vapor.

Figure 7:
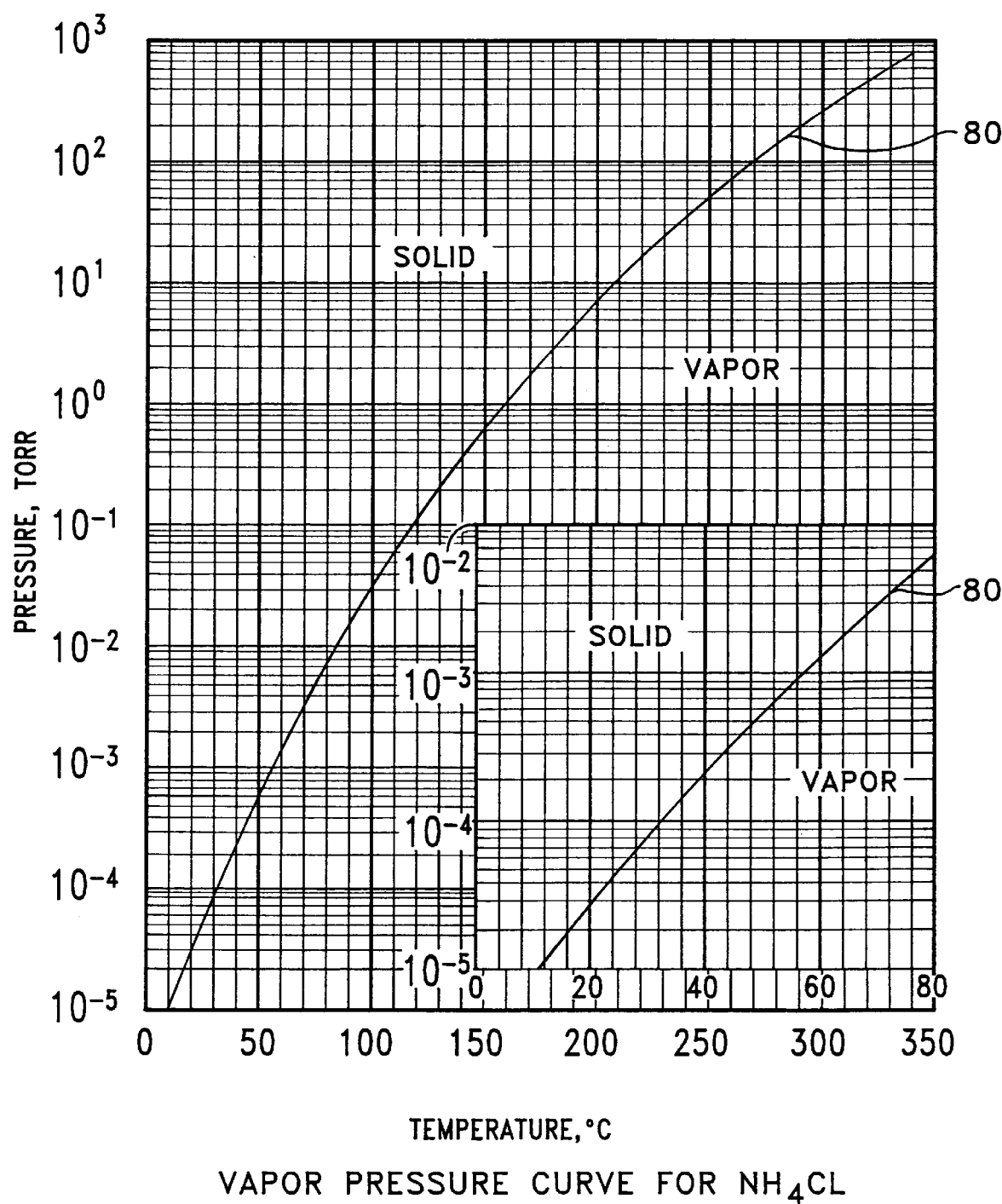
FIG. 7 is a graph of the vapor pressure curve for ammonium chloride ($NH_4Cl$)

The vapor pressure of a condensable vapor is related to the temperature of the condensable vapor, which can be expressed by the Antoine equation:

$$\ln p = A - \frac{B}{T+C} \quad (4)$$

where A, B, and C are constants, p is the vapor pressure measured in Torr, and T is the temperature measured in degrees celsius. For ammonium chloride ($NH_4Cl$), A is approximately equal to 23.4, B is approximately equal to 10,613, and C is approximately equal to 292.3. The vapor pressure curve 80 for ammonium chloride ($NH_4Cl$) is shown in FIG. 7.

Continuing the example discussed above in relation to equation (1), if it is assumed that the temperature of the gas byproducts G entering the trap 30 is 130° C. and the partial pressure of the ammonium chloride ($NH_4Cl$) is 100 milliTorr, an initial temperature decrease of approximately twenty degrees celsius (20° C.) will result in a condensation of approximately fifty percent (50%) of the ammonium chloride ($NH_4Cl$) in the gas byproducts G flowing through the trap 30. An initial temperature decrease of approximately forty-four degrees celsius (44° C.) will result in a condensation of approximately ninety percent (90%) of the ammonium chloride ($NH_4Cl$) in the gas byproducts G flowing through the trap 30. A second temperature decrease of approximately fifty degrees celsius (50° C.) will result in a condensation of approximately ninety percent (90%) of the remaining ten percent (10%) ammonium chloride ($NH_4Cl$) in the gas byproducts G flowing through the trap 30. As previously discussed above, therefore, controlling the temperature profile across the trap 30 will significantly control the deposition profile of the trap 30.

Therefore, in order to obtain a trap 30 that has a high trap capacity in a reasonable physical size, uses most of its available trap volume, and does not become prematurely clogged at the entrance port 32 to the trap 30 or in the entrance port extension 62, the cooling of the gas byproducts G entering the trap 30 through the entrance port 32 should be limited so that condensation of the gas byproducts G at these locations is minimized. In other words, the temperature profile of the trap 30 should be such that the trap 30 does not clog prematurely at the entrance port 32. Therefore, the first stage of the trap 30, which consists of the entrance port 32, the entrance port extension 62, and the first stage volume 82 in the main housing 60 (see FIGS. 8 and 9), functions as a poor heat exchanger to prevent premature clogging of the trap 30, as will be discussed in more detail below. The first stage volume 82 includes all of the interior volume of the main housing 60 of the trap 30, except for the portion of the volume contained within the hollow cylindrical sleeve 94. The first stage of the trap 30 includes a relatively large first stage volume 82 to extend the time between required cleanings of the trap 30, as will also be discussed in more detail below.

As previously discussed above, heat transfer between the molecules of condensable vapor in the gas byproducts G and the interior surfaces of the trap 30 is not usually efficient, because the amount of heat transferred by conduction, convection, and radiation is quite small in a vacuum where molecular density is very low. A gas molecule of a condensable vapor, such as ammonium chloride ($NH_4Cl$), can be cooled efficiently, however, if a direct collision occurs between the gas molecule and an interior surface of the trap 30 since the collision will transfer energy in the form of heat from the gas molecule to the trap 30. Therefore, since it is preferred according to this invention that the first stage of the trap 30 not function as an efficient heat exchanger in order to avoid deposition of large initial amounts of the condensable gas byproduct in the inlet area, it is necessary to limit the amount of heat transfer between the condensable vapor in the gas byproducts G and the trap 30 by limiting the direct impact of the gas molecules of the condensable vapor in the gas byproducts G with interior surfaces of the first stage of the trap 30, as will be discussed in more detail below. Therefore, the number of interior surfaces in the first stage of the trap 30 upon which the flowing gas byproducts G can directly impact or impinge is limited in the first stage of the trap 30, particularly in comparison with the number of interior surfaces in the second stage of the trap 30 upon which the flowing gas byproducts G can directly impact or impinge, as will also be discussed in more detail below.

Now referring to FIGS. 8–10, the first stage of the trap 30 will now be discussed in greater detail. The gas byproducts G flow into the trap 30 through the entrance port 32, as shown by the flow arrows 95, and do not impact or impinge significantly upon the entrance port 32 or the interior surface 90 of the entrance port extension 62. Instead, the gas byproducts G flow into the first stage volume 82 and generally around the outside surface 92 of the cylindrical sleeve 94. Since flow in this manner around the smoothly rounded surface 92 is generally uninterrupted, it is fairly laminar and molecular impact on surfaces is minimized. Still, because of the change of flow direction in the first stage volume 82 caused by cylindrical sleeve 94, there is substantial, but not excessive, molecular impact, thus heat exchange and deposition on the portion of the outside surface 92 of the cylindrical sleeve 94 that faces the incoming gas G flow from the inlet port 32. The impact of the molecules of the condensable vapor in the gas byproducts G on the outside surface 92 of the cylindrical sleeve 94 causes the condensable vapor to condense, solidify, and accumulate on the outside surface 92 of the cylindrical sleeve 94. The curvature of the cylindrical sleeve 94 allows some of the gas byproducts G to also flow toward the rear inside surface 96 of the main housing 60 so that some of the condensation of the condensable vapor in the gas byproducts G is distributed throughout the first stage of the trap 30. Since the amount of the gas byproducts G that flows toward the rear inside surface 96 of the main housing 60 is smaller than the amount of the gas byproducts G that impact directly on the outside surface 92 of the cylindrical sleeve 94, most of the condensation and deposition of the condensable vapor in the gas byproducts G occurs between the cylindrical sleeve 94 and the entrance port extension 62. As will be discussed in more detail below, the cylindrical sleeve 94 also prevents the condensable vapor in the gas byproducts G in the first stage volume 82 from impacting cooling surfaces in the second stage of the trap 30, especially surfaces of the cooling coil tube 120, which would accelerate heat exchange, thus deposition, to an unacceptable level in the inlet area of the main first stage volume 82 and clog the inlet prematurely. Also, as deposition builds on the outside surface 92 and inside surface 106 near the entrance port 32, the heat transfer from molecules impinging such deposition build-up becomes less efficient, because the deposition material itself does not conduct heat as well as the walls of sleeve 94 and body 60, which are preferably metal. Therefore, with such build-up on surfaces 92 and 106 near the entrance port 32, the deposition naturally distributes some to portions of the surfaces 92 and 106 or 96 that are more remote from the entrance port 32, which distribution is enhanced, as described above, by the smoothly curved surfaces 92 and 106.

The longitudinal axis 98 of the cylindrical sleeve 94 is preferably offset from the longitudinal axis 100 of the cylindrical main housing 60 so that the cylindrical sleeve 94 is eccentric to the cylindrical main housing 60 and so that the distance between the outside surface 92 of the cylindrical sleeve 94 and the interior end 102 of the entrance port extension 62 is maximized. This eccentric configuration of the main housing 60 around the cylindrical sleeve 94 maximizes the first stage volume 82 of the trap 30, which maximizes the amount of deposition accumulation of the condensable vapor in the gas byproducts G that occurs between the cylindrical sleeve 94 and the entrance port extension 62 before the trap 30 becomes clogged and requires cleaning or before flow conductance of the trap through the trap 30 is reduced enough to require cleaning. While the longitudinal center axis 98 of the cylindrical sleeve 94 could be aligned concentrically with the longitudinal center axis 100 of the cylindrical main housing 60, such concentric alignment would reduce the distance between the outside surface 92 of the cylindrical sleeve 94 and the interior end 102 of the entrance port extension 62, unless the inner diameter of the main housing 60 is enlarged. Such enlargement of the entire main housing structure 60 to increase the first stage volume 82 is an option, of course, but it is more economical to maximize the deposition volume available according to this invention and to optimize the deposition profile within the trap 30 without necessarily increasing overall size dimensions. Increasing the inner diameter of the main housing 60 would increase the amount of material needed for the main housing, thus increasing the cost as well as the size and weight of the trap 30, thus making it more difficult or expensive to manufacture, assemble, ship, mount, and clean the trap 30. By offsetting the cylindrical sleeve 94 within the main housing 60 so that the longitudinal center axis 98 of the cylindrical sleeve 94 is eccentric to the longitudinal center axis 100 of the cylindrical main housing 60, the capacity and usable volume of the trap 30 is increased for any given inner diameter of the main housing 60. Therefore, offsetting the cylindrical sleeve 94 within the main housing 60 also helps optimize the deposition profile of condensed material in the trap 30.

For purposes of explanation, but not limitation, of the structure and operation of the trap 30 of the present invention, the cylindrical sleeve 94 can have an outer diameter of approximately four inches, a wall thickness of approximately $65/1000$ of an inch, and a length 103 of approximately eight and one-half inches, where approximately six and one-half inches of the length 103 is in the interior volume 82 of the main housing 60. The longitudinal center axis 98 of the cylindrical sleeve 94 can be offset approximately three quarters of an inch from the longitudinal center axis 100 of the main housing 60.

Figure 9:
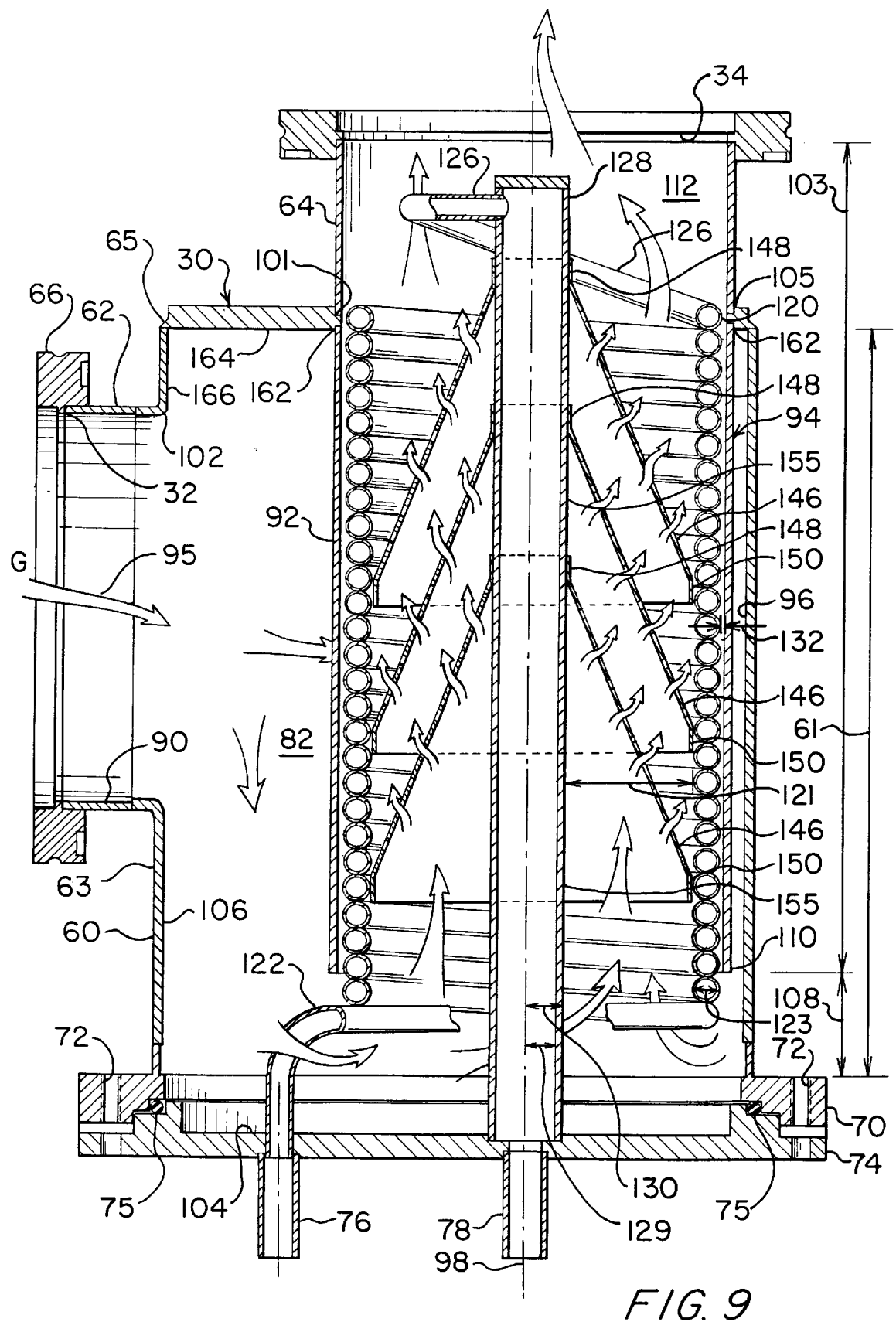
FIG. 9 is a cross-sectional view of the trap of FIG. 1, taken along the line 9—9 of FIG. 8.

Referring now specifically to FIG. 9, the cylindrical sleeve 94 includes the exit port extension 64, which can be part of the cylindrical sleeve 94 or, as shown in FIG. 9, it can be a separate sleeve that seats on a collar 105 around the opening 101 in the top plate 63 of the housing 60. These arrangements are in contrast to the entrance port extension 62, which is part of the main housing 60. The cylindrical sleeve 94 extends downwardly into the main housing 60 from the opening or hole 101 in the top plate 63 of the main housing 60 toward, but not all the way to, the inner surface 104 of the base plate 74 mounted on the lower end of the main housing 60. The cylindrical sleeve 94 is rigidly attached to the main housing 60 by welding and an hermetic seal is created between the main housing 60 and the cylindrical sleeve 94 at the opening 101.

The cylindrical sleeve 94 does not contact the side inner surface 106 of the main housing 60 and does not extend all of the way to the inner surface 104 of the base plate 74 of the main housing 60. A gap of a distance 108 is left between the end 110 of the cylindrical sleeve 94 and the inner surface 104 of the base plate 74 of the main housing 60 so that the gas byproducts G that are not deposited on the outside surface 92 of sleeve 94 or on the inside surface 106 or 96 of housing 60 can flow into the interior 112 of the cylindrical sleeve 94, as will be discussed in more detail below. The gap distance 108 can be, for example, approximately one inch.

The interior volume of the cylindrical sleeve 94 comprises the second or scrubber stage of the trap 30. While a large majority of the condensable vapor in the gas byproducts G flowing through the trap 30 will condense in the first or primary stage of the trap 30, there is still a significant amount, perhaps as much as five percent (5%), of condensable vapor left in the gas byproducts G that needs to be removed in the second or scrubber stage before the remainder of the gas byproducts exit the trap 30 through the exit port 34. In order to condense the remaining condensable vapor in the gas byproducts G, however, more efficient and thorough heat exchange is needed. For example, a large temperature drop and more surface configurations to maximize molecular impact with cold surfaces are needed in the second stage of the trap 30 that were not needed or desired in the first stage of the trap 30. Therefore, in the second stage of the trap 30, in contrast to the first stage of the trap 30, the temperature of the gas byproducts G is reduced significantly to increase the efficiency of the trap 30 by condensing the condensable vapor left in the gas byproducts G after the gas byproducts G pass through the first stage of the trap 30. The second stage of the trap 30, in contrast to the first stage of the trap 30, also functions as a very efficient heat exchanger in order provide heat transfer between the trap 30 and the condensable vapor in the gas byproducts G. As previously discussed, however, since the trap 30 is usually operating at very high vacuum (very low pressure), any heat transfer between the molecules of condensable vapor with the cooling surfaces in the second stage of the trap 30 occurs primarily by the physical collision of the molecules of condensable vapor in the gas byproducts G and the cooling surfaces in the trap 30, while heat transfer by conduction, convection, and radiation in the vapor or gas phase is negligible. The collision of the molecules of condensable vapor in the gas byproducts G and the interior surfaces in the trap 30 will cause heat (energy) to be transferred from the molecules to the trap 30. In addition, and as will be discussed in more detail below, it is desirable to keep a high flow conductance across the trap 30. Therefore, the second stage of the trap 30 cannot significantly reduce the flow conductance of the trap 30. In addition, it is desirable to have a very low pressure drop between the entrance port 32 of the trap 30 and the exit port 34 of the trap 30 so that the flow conductance of the trap 30 at the exit port 34 is approximately equal to the flow conductance of the trap 30 at the entrance port 32. Since the volume flow rate through the trap 30 is very high, and the mass flow rate through the trap 30 is very low, the second stage of the trap must provide not only large surface areas upon which the molecules of the condensable vapor can impact, but also a large cross-sectional area to maintain a high flow conductance of the trap 30. As previously discussed above, the amount of interior surface area in the second stage of the trap 30 upon which the flowing gas byproducts G can directly impact or impinge is preferably quite large in the second stage of the trap 30, particularly in comparison with the limited amount of interior surface area in the first stage of the trap 30 upon which the flowing gas byproducts G can directly impact or impinge.

A hollow cooling tube 120 that is coiled to form a cylinder is positioned concentrically within the cylindrical sleeve 94. It can have an inner diameter 121 of, for example, 3.35 inches in the exemplary embodiment described above. The cooling coil tube 120 can be made of a hollow tubular material, such as stainless steel tubing, with an inner diameter 123 of, for example, three-sixteenths of an inch. The cooling coil tube 120 terminates at one end in a curved portion 122 that extends through the base plate 74 of the main housing 60. A hollow cylindrical pipe or supply tube 76 that is used to connect the cooling coil tube 120 with an external cooling fluid supply (not shown) is also mounted in the base plate 74, as shown in FIG. 9, in fluid flow alignment with the terminal portion 122 of coil tube 120. The cooling coil tube 120 terminates at the other end in curved portion 126 that connects the cooling coil tube 120 to the hollow cylindrical center tube 128. The center tube 128 is positioned concentric with the longitudinal axis 98 of the cylindrical sleeve 94 and extends from near the outlet extension 64 on top to the base plate 74 below the bottom 110 of sleeve 94. This center tube 128 can have an inner diameter 129 of, for example, 0.60 inches and an outer diameter 130 of, for example, three-quarters of an inch (0.75 inches) in the exemplary embodiment trap 30 described above. The lower end of the center tube 128 extends the base plate 74 of the main housing 60. A hollow cylindrical outlet pipe or tube 78 is mounted in the removable plate 74 in fluid flow alignment with the center pipe or tube 128. The combination of the cooling coil tube 120, the curved portions 122, 126, the hollow center tube 128, and the cylindrical pipes or tubes 76, 78 form a continuous fluid flow path for a liquid, such as cooling water or, or a cooling gas, to flow through the second stage of the trap 30. The cooling fluid flowing through the cooling coil tube 120 and the center tube 128 can enter the trap 30 through the cylindrical pipe 76 and exit the trap 30 through the cylindrical pipe 78 or, alternatively, the cooling fluid flowing through the cooling coil tube 120 and the center tube 128 can enter the trap 30 through the cylindrical pipe 78 and exit the trap 30 through the cylindrical pipe 76. In either situation, the flowing cooling fluid helps determine the temperature profile of the trap 30 and the flow direction is preferably chosen so as to optimize the deposition profile of the condensable vapor in the trap 30.

As previously discussed above, the cylindrical sleeve 94 also prevents the condensable vapor in the gas byproducts G in the first stage of the trap 30 from contacting second stage cooling surfaces, such as the cooling coil tube 120 or the hollow center tube 128, when the gas byproducts G first enter the trap 30 through the entrance port 32. The gas byproducts G can only impact the cooling coil tube 120 and the hollow center tube 128 after the gas byproducts G enter the second stage of the trap 30 by flowing into the interior volume 112 of the cylindrical sleeve 94, thereby increasing the efficiency of trap 30. Preventing the gas byproducts G from impacting the cooling coil tube 128 and the center tube 128 in the first stage of the trap 30 reduces heat transfer between the cooling coil tube 120 and the center tube 128 and the gas byproducts G in the first stage of the trap 30. A gap 132 exists between the cooling coil tube 120 and the inner surface 134 of the cylindrical sleeve 94, which allows for easy assembly of the cooling coil tube 120 within the cylindrical sleeve 94. The gap 132 can have a width of, for example, 0.020 inches.

Figure 11:
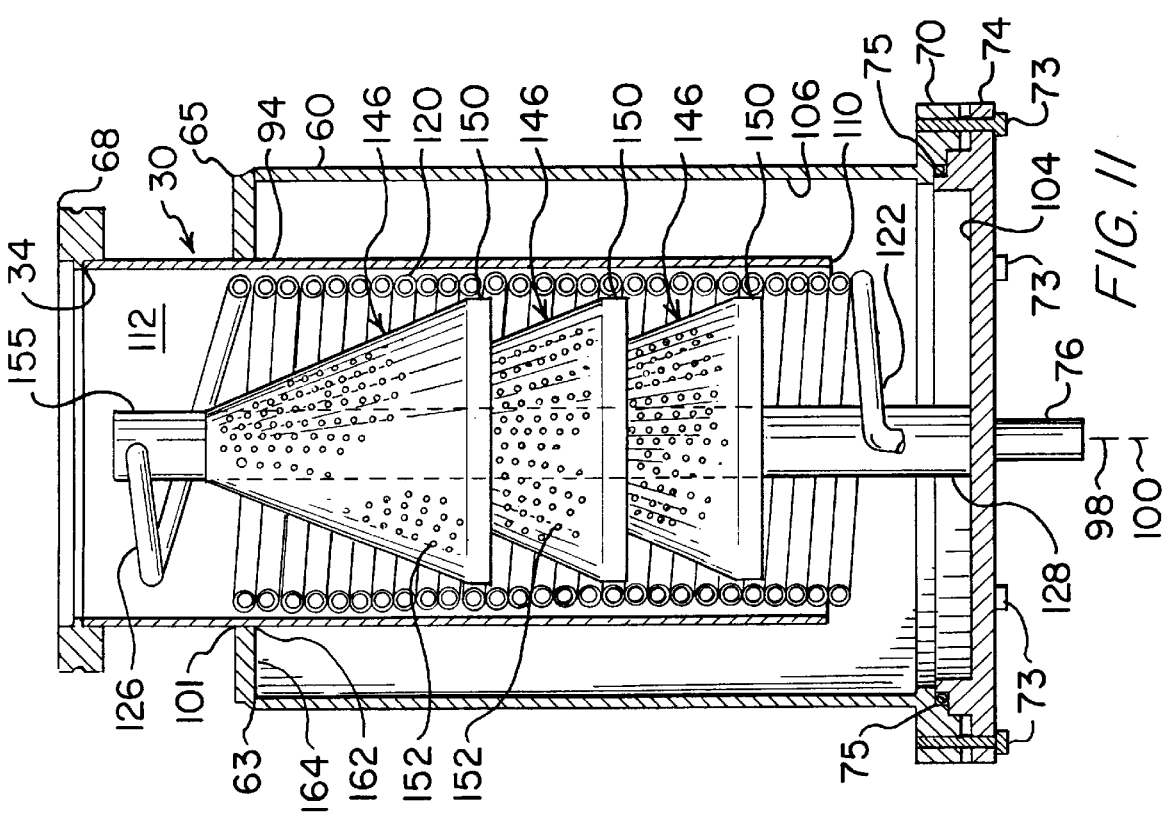
FIG. 11 is a cross-sectional view of the trap of FIG. 1, taken along the line 11—11 of FIG. 8, showing the interior area of the second state in the main housing.

Referring now to FIGS. 9 and 11, the preferred embodiment second stage of the trap 30 of the present invention includes a plurality of perforated cones 146 attached to and extending outwardly and downwardly from the outside surface of the hollow center tube 128. The cones 146 are preferably fastened at their necks 148 to the center tube 128 by welding, or other suitable method. The bottom outside surface 150 of the cones 146 are also preferably in direct physical contact with the cooling coil tube 120. With the cones in physical contact with both the cooling coil tube 120 and the center tube 128, there are good thermal paths through the cones 146 between the cooling coil tube 120 and the center tube 128 so that the cones 146 are cooled efficiently by the cooling fluid that flows through the cooling coil tube 120 and the hollow center tube 128. The cones 146 can also be left unconnected to either the center tube 128 or the cooling coil tube 120 since either of these changes will change the temperature profile of the trap 30 and, as a result, the deposition profile of the trap 30. The cones 146 have a valving or obstructing effect in the second stage of the trap 30 in that the cones 146 can significantly impede and reduce the flow of the gas byproducts G through the second stage of the trap 30 and, therefore, the flow conductance of the second stage of the trap 30. While only three cones 146 are shown in FIGS. 9 and 11, more or fewer cones 146 can be used so long as the second stage of the trap 30 provides enough surface area upon which the molecules of the condensable vapor in the gas byproducts G can impact, condense, and accumulate and so long as the second stage of the trap 30 does not significantly impede the flow of the gas byproducts G through the trap 30. The cones 146 can also have different and varying sizes and shapes.

Figure 8:
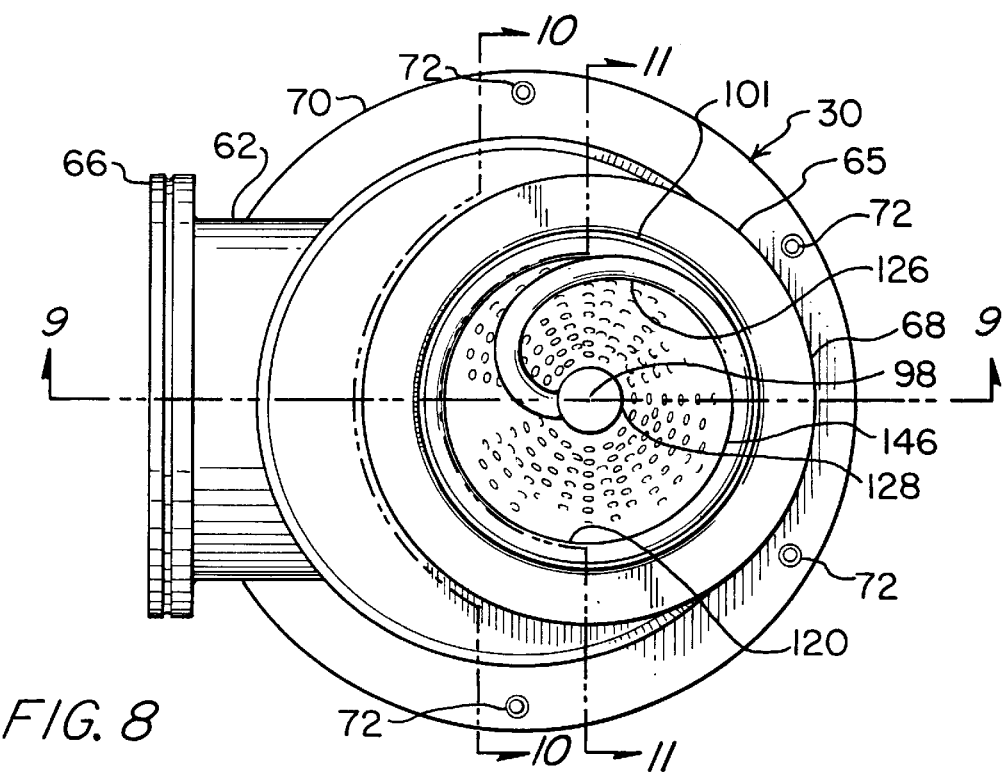
FIG. 8 is a top plan view of the trap of FIG. 1, showing the cooling coil tube, the cones, and the center conduit of the preferred embodiment of the present invention.

Referring now to FIGS. 8, 9 and 11, each of the cones 146 is preferably perforated with a plurality of holes 152 to allow flow of gas byproducts G through the second stage 112, while the unperforated portions of the cones 146 provide impact surfaces for condensable molecules in the gas byproducts G. The diameters of the perforated holes 152 are not particularly critical as long as they are large enough to allow gas flow through the cones without significant impedance or pressure drop. For the exemplary embodiment described above, such holes having a diameter of approximately 5/32 of an inch are satisfactory with a hole density of approximately sixty-three percent (63%) of the surface area of the cones 146. If desired, the diameter of the holes 152 in the cones 152 can vary over the surface of the cones 146. The holes 152 in the cones 146 serve several important functions. First, the holes 152 allow the gas byproducts G to flow through the cones 146 so that the flow conductance of the trap 30 is not significantly reduced by the cones 146 or, in other words, so that the flow of the gas byproducts G through the second stage of the trap 30 is not significantly impeded or reduced. Second, the holes 152 increase the number of edges upon which the molecules of condensable vapor in the gas byproducts can impact, thereby increasing the heat transfer from the molecules of condensable vapor to the cones 146, which causes the molecules of condensable vapor to condense and accumulate on the cones 146 in the second stage of the trap 30 and increases the scrubbing efficiency of the trap 30. Third, the gas byproducts G that flow through the holes 152 without impacting the cones 146 are directed by the perforated cones outwardly toward the cooling coil tube 120 so that the molecules of condensable vapor in the gas byproducts G are more likely to impact the cooling coil tube 120, thereby increasing the heat transfer from the molecules of condensable vapor to the cooling coil tube 120, which causes the molecules of condensable vapor to condense and accumulate on the cooling coil tube 120 in the second stage of the trap 30 and increases the scrubbing efficiency of the trap 30. While it is preferable to use circular holes in the cones 146 in the second stage of the trap 30, triangular, square, rectangular, or other shaped holes can also be used.

Figure 13:
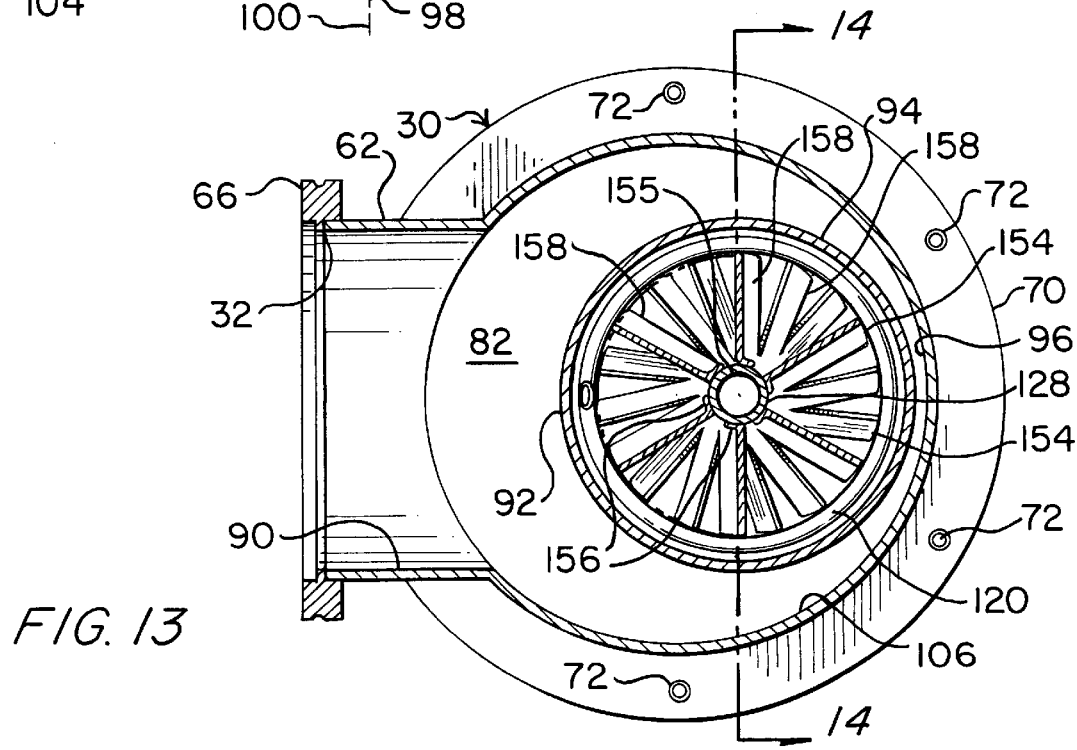
FIG. 13 is a cross-sectional view similar to FIG. 12, but showing a second embodiment of the trap of FIG. 1, wherein the trap uses fins instead of cones in the second stage of the trap.
Figure 14:
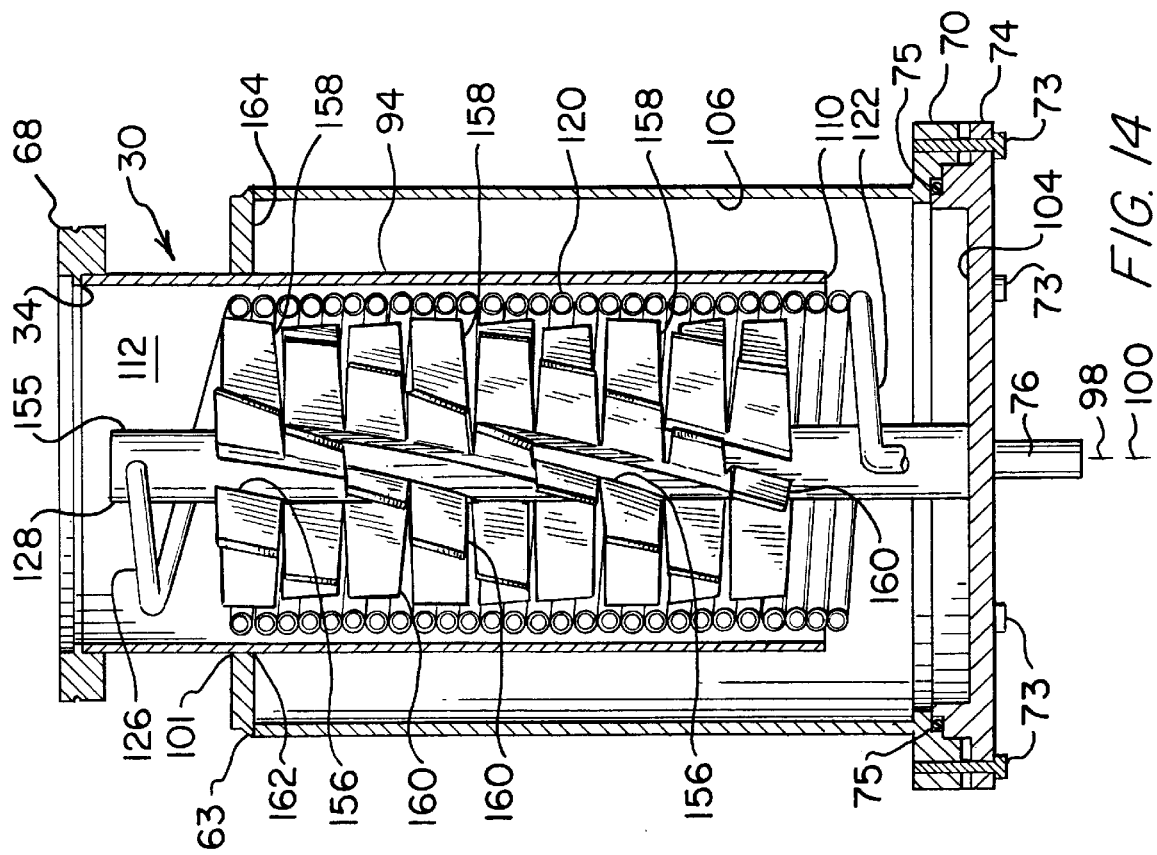
FIG. 14 is a cross-sectional view similar to FIG. 11, but showing the alternative fin embodiment of FIG. 10 in the interior area of the main housing of the trap.

Although the cones 146 in the second stage of the trap 30 are preferred, there are many other possible surface configurations that can provide sufficient impact surface area in the second stage while not substantially impeding the gas flow. For example, referring to FIGS. 13 and 14, the fins 154 could be used instead of the cones 146. Each of the fins 154 is attached by welding, spot welding, or other suitable method to the outside surface 155 of the hollow center tube 128 at the base 156 of the fin 154. The fins 154 can also be in direct physical contact with the cooling coil tube 120 so that the fins 154 are cooled by the cooling fluid flowing through the cooling coil tube 120 and the center tube 128. The fins 154 are connected to the center tube 128 so that the fins 154 form a series of parallel spirals up the outside surface of the center tube 128. In addition, the fins 154 are connected to the hollow center tube 128 so that each of the fins 154 as attached at an angle $\alpha$ to the hollow center tube 128. The angle $\alpha$ is preferably between, for example, ten degrees (10°) and forty-five degrees (45°) and is optimally between fifteen degrees (15°) and thirty degrees (30°).

In a similar fashion to the cones 146 discussed above, the fins 154 will affect the molecules of the condensable vapor in the gas byproducts G flowing through the second stage of the trap 30 in a number of ways to cause them to collide with surfaces, while not significantly reducing the flow conductance of the trap 30. First, each of the fins 154 contains a lower edge 158 (or surface depending on the thickness of the fin 154) and a side surface 160 upon which the molecules of condensable vapor in the gas byproducts G can impact, thereby increasing the heat transfer from the molecules of condensable vapor to the fins 154, which causes the molecules of condensable vapor to condense and accumulate on the fins 154 in the second stage of the trap 30 and increases the scrubbing efficiency of the trap 30. Second, the gas byproducts G that flow through the spiraled fins 154 without impacting the fins 154 are directed outward toward the cooling coil tube 120 so that the molecules of condensable vapor in the gas byproducts G are more likely to impact the cooling coil tube 120, thereby increasing the heat transfer from the molecules of condensable vapor to the cooling coil tube 120, which causes the molecules of condensable vapor to condense and accumulate on the cooling coil tube 120 in the second stage of the trap 30 and increases the efficiency of the trap 30.

Figure 10:
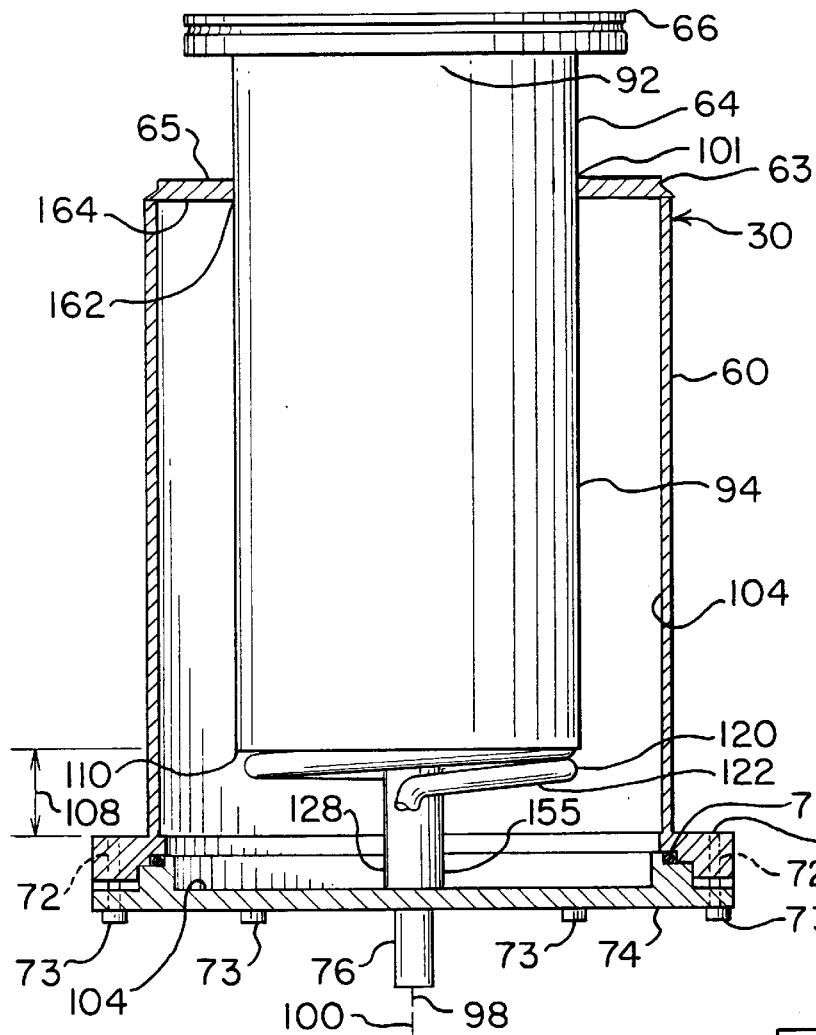
FIG. 10 is a cross-sectional view of the trap of FIG. 1, taken along the line 10—10 of FIG. 8, showing the interior area of the first stage in the main housing.

As shown in FIGS. 9 and 10, the cylindrical sleeve 94 is rigidly attached and hermetically sealed around its circumference 162 to the top plate 63 of the main housing 60 by welding, or other suitable method. Therefore, the gas byproducts G entering the trap 30 can exit the trap 30 only by flowing through the hollow interior or second stage 112 of the cylindrical sleeve 94. The O-ring 75 between the base flange 70 of the trap 30 and the removable base plate 74 also prevents the gas byproducts G from escaping out of the trap 30. All of the components of the trap 30 except the O-ring 75, including the main housing 60, the flanges 66, 68, the cylindrical pipes 76, 78, the cooling coil tube 120, the curved portions 122, 126, the hollow center tube 128, the cylindrical sleeve 94, and the cones 146 can comprise a stainless steel material or other suitable material which has the desirable properties of being able to withstand the heat of the gas byproducts G and being able to conduct heat readily from the gas byproducts G to the cooling fluid flowing through the cooling coil tube 120 and the hollow center tube 128. The O-ring 75 can comprise a viton, rubber, neoprene, or other suitable material for creating and holding an hermetic seal.

As previously discussed above, it is important to maintain a relatively constant, substantially unimpeded flow of the gas byproducts G through the trap 30 so that only a very low, preferably negligible, pressure drop is maintained between the entrance port 32 of the trap 30 and the exit port 34 of the trap 30, and so that the flow conductance of the trap 30 at the exit port 34 is approximately equal to the flow conductance of the trap 30 at the entrance port 32. The flow conductance of the trap 30 will decrease continuously over time between cleanings of the trap 30, however, due to the accumulation of the condensed vapor, such as ammonium chloride ($NH_4Cl$), in the trap 30. It should be noted that the flow conductance of the trap 30 can be different at different locations in the trap 30, since flow conductance is dependent on the velocity of the gas byproducts G, particularly when the system pressure in the trap 30 is low (for example, less than ten milliTorr). The velocity of the gas byproducts G can be different at different locations in the trap 30 due to the varying temperature of the gas byproducts G as well as the varying mass flow rate in the trap 30. The varying temperatures of the gas byproducts G is a result of the heat or energy transfer between the gas byproducts G and the trap 30. The varying mass flow rate in the trap is a result of the continuous sublimation or condensation in the trap 30 of the condensable vapor in the gas byproducts G.

In order to maintain a relatively high flow conductance in the trap 30, the flow conductance of the trap 30 at the location in the trap 30 where the minimum flow conductance exists should be equal to or slightly higher than the flow conductance of the heated piping line segment 46 connected to the entrance port 32 of the trap 30. Since the cross-sectional area in the first stage of the trap 30 is preferably much larger than the cross-sectional area $A_2$ of the second stage of the trap 30, a higher conductance is expected in the first stage of the trap 30 than in the second stage of the trap 30 when no accumulation of condensed material has yet occurred in the trap 30. Therefore, the second stage of the trap 30 is the location in the trap 30 having the minimum flow conductance. Thus, in order to maintain a relatively constant flow conductance in the trap 30, the following relationship between the cross-sectional area of the piping line segment 46 ($A_0$) and the cross-sectional area of the second stage ($A_2$) should be maintained:

$$A_2 \geq \frac{T_2}{T_0} A_0 \tag{5}$$

where $A_0$ is the cross-sectional area of the piping line segment 46, $T_2$ is the temperature $T_0$ in degrees kelvin of the gas byproducts G flowing in the piping line segment 46 and into the trap 30 through the entrance port 32, $A_2$ is the cross-sectional area of the second stage of the trap 30, and $T_2$ is the temperature of the gas byproducts G flowing in the second stage of the trap 30. Equation (5) is obtained without consideration of the amount of the condensed material in the trap 30 or, in other words, without the condition of requiring a constant mole flow rate where a mole is equal to an Avogadro's number ($6.230 \times 10^{23}$) of the molecules of the gas byproducts G. Equation (5) is usable, however, for the situations when only inert and non-condensable gas such as nitrogen is flowing through the trap 30 since the mole flow rate will vary for a condensable gas flowing through the trap 30.

When the change in the mole flow rate of a condensable vapor flowing through the trap 30 is taken into consideration, the following relationship is obtained:

$$A_2 \geq \frac{n_2}{n_0} \frac{T_2}{T_0} A_0 \tag{6}$$

where $A_0$ is the cross-sectional area of the piping line segment 46, $T_0$ is the temperature in degrees kelvin of the gas byproducts G flowing in the piping line segment 46 and into the trap 30 through the entrance port 32, $A_2$ is the cross-sectional area of the second stage of the trap 30, and $T_2$ is temperature in degrees kelvin of the gas byproducts G flowing in the second stage of the trap 30. The value $n_0$ is the mole flow rate of the gas byproducts G flowing in the piping line segment 46 and $n_2$ is the mole flow rate of the gas byproducts G flowing through the second stage of the trap 30. Note that equation (5) is a simplification of equation (6) when $n_0$ equals $n_2$. In the typical semiconductor manufacturing process described above in relationship with FIG. 2 or in another sublimation or condensation process, $n_2$ is always less than $n_0$, thereby always making $n_2/n_0$ less than one, unless something other than a condensable vapor is flowing through the piping line which may occur when, for example, a purging process is being undertaken to remove gases such as nitrogen from the reaction furnace 40. Therefore, using equation (5) instead of equation (6) to determine the cross-sectional area of the second stage of the trap 30 ($A_2$) will result in a slightly higher flow conductance for the second stage of the trap 30.

In the example portion of a semiconductor manufacturing process discussed above in relationship with FIG. 2, where ammonium chloride ($NH_4Cl$) is the condensable vapor to be removed from the gas byproducts G, the inner diameter of the piping line segments 42, 46 is assumed to be approximately 3.87 inches and the mole concentration of $NH_4$ in the gas stream is fifty percent (50%). Therefore, the cross-sectional area $A_0$ of the piping line segments 42, 46 is approximately 11.76 square inches. If the temperature $T_0$ of the gas byproducts G flowing through the piping line segment 46 is approximately 423 degrees kelvin (423° K) which is one-hundred fifty degrees celsius (150° C.) and the temperature $T_2$ of the gas byproducts G at the entrance to the second stage of the trap 30 is assumed to be approximately 353 degrees kelvin (353° K) or eighty degrees celsius (80° C.), then assuming a trapping efficiency of the first stage of the trap 30 of approximately ninety-five percent (95%), $n_0$ equal to one (1), and $n_2$ equal to 0.525, the cross-sectional area $A_2$ of the second stage of the trap 30 needs to be, at a minimum, approximately 5.15 square inches. Since the main housing 60 can have an outer diameter of approximately six inches and an inner diameter of approximately 5.83 inches and the cooling coil tube 120 can have an inner diameter 121 of approximately 3.35 inches and consequently an outer diameter of approximately 3.85 inches, as previously discussed above, the cross-sectional $A_2$ of the second stage of the trap 30 is approximately equal to 8.81 square inches when the cooling coil tube 120 is taken into account. Therefore, the second stage of the trap 30 will not create a significant reduction in the flow conductance of the trap 30 and will still have considerable space available for trapping the condensable vapor in the gas byproducts G flowing through the first stage of the trap 30.

Equations (5) and (6) can be applied to determine the cross-sectional area $A_2$ of the second stage of the trap 30 because the amount of deposition of the condensable vapor in the second stage of the trap 30 is significantly less than the amount of deposition of the condensable vapor in the first stage of the trap 30. For example, it is possible for the amount of deposition in the first stage of the trap 30 to be twenty times more than the amount of deposition in the second stage of the trap 30. Therefore, since there is relatively little deposition in the second stage of the trap 30, there is relatively little accumulation of the condensable material in the second stage of the trap 30 and the cross-sectional area $A_2$ of the second stage will not significantly change over time, as shown by FIGS. 3 and 4. In fact, the temperature at the exit port 34 of the trap 30 can be controlled by heaters or cooling coils such that there is no accumulation of the condensed vapor at the exit port 34 of the trap 30, as previously discussed above.

Equations (5) and (6) cannot be used, however, to determine the desired cross-sectional area at all other locations in the trap 30 since the cross-sectional area $A_{depX}$ of deposited and accumulated condensed material at a location X in the trap 30 changes with time due to the accumulation of condensed material at the location X, where X equals the distance between the designated location in the trap 30 and the entrance of the trap 30. Therefore, it is necessary to use a more general equation than equation (6) to determine the desired cross-sectional area $A_X$ of the trap 30 at different locations X in the trap, such as:

$$A_X \geq \frac{n_x}{n_0} \cdot \frac{T_x}{T_0} \cdot A_0 + A_{depX} \tag{7}$$

where $A_X$ equals the desired cross-sectional area of the trap 30 at the location X in the trap 30, $n_X$ is the mole flow rate of the gas byproducts G flowing through the trap 30 at the location X, $T_X$ is the temperature of the gas byproducts G flowing through the trap 30 at the location X, $A_{depX}$ is the cross-sectional area of the deposited and accumulated condensable material in the trap 30 at the location X, and all other variables are the same as those for equations (5) and (6) discussed above. Equation (7) is graphically represented in FIG. 5, graph (C), and provides the relationship between the deposition profile $A_{depX}$ in the trap 30, the temperature profile in the trap 30, and the physical geometry of the trap 30. As discussed above in relation to FIGS. 3 and 4, the deposition profile $A_{depX}$ within a trap 30 will grow over time and the curve $A_{depX}$ will approach the curve $A_X$. As the accumulation of deposited condensable vapor grows over time during operation of the trap 30, the flow of gas byproducts G through the trap 30 remains possible, and the flow conductance of the trap 30 remains greater than zero, until the deposition profile within the trap 30 grows such that a point on the curve $A_{depX}$ has reached a point on the preferred geometry curve $A_X$. As previously discussed above, however, the flow conductance of the trap 30 will become significantly reduced as the curve $A_{depX}$ approaches the curve $A_X$ and the flow conductance of the trap 30 will be essentially zero when any point on the curve $A_{depX}$ reaches the curve $A_X$ (which represents a clogged condition in the trap 30).

Since a significant reduction in flow conductance of the trap 30 is often not desirable, it is preferable to stop operation of the trap 30 and clean the trap 30 when the flow conductance of the trap 30 is reduced to a predetermined level or, in other words, when the gap between the curve $A_{depX}$ and the curve $A_X$ in FIG. 5, graph (c), is reduced to a predetermined minimum at a location X in the trap 30. For example, it may be desirable to stop operation of the trap 30 and clean the trap 30 when:

$$A_X - A_{depX} = A_2 \tag{8}$$

so that gap between the curves $A_X$ and $A_{depX}$ is always greater than or equal to the cross-sectional area $A_2$ of the second stage of the trap 30.

As shown by equation (7), and as previously discussed above in relation to FIGS. 3–5, premature clogging of the trap 30 can be prevented by insuring that every location X in the trap 30 has a cross-sectional area $A_X$ and a temperature $T_X$ that satisfies equation (7), once the predetermined minimum level of flow conductance for the trap 30 (as exemplified by the minimum allowable gap between the curves $A_X$ and $A_{depX}$) has been determined. Since satisfying equation (7) for every location X may be practically difficult, if not impossible, the trap 30 will have certain locations/points that reach the minimal allowable gap between the curves $A_X$ and $A_{depX}$ before other locations/points in the trap 30. It is important to note that, given the complex geometry of the trap 30, it may also be practically difficult to ascertain the cross-sectional area of the trap 30 at any given location/point in the trap 30 or the cross-sectional area of the deposited condensed material at the given location/point in the trap 30.

As previously discussed, $A_{depX}$ is the cross-sectional area of the deposited condensed material that accumulates in the trap 30 at location X during operation and use of the trap 30. The capacity of the trap of the trap 30 is closely related to the cross-sectional area $A_{depX}$ and can be calculated as:

$$\text{TrapCapacity} = \rho \int_{entrance}^{exit} A_{depX} dx \tag{9}$$

where $\rho$ is the density of the condensed condensable vapor in the gas byproducts G. Equation (8) indicates that the capacity of the trap 30 is closely related to the deposition profile curve $A_{depX}$ for the trap 30 which, as shown in FIG. 3, is affected by the temperature profile of the trap 30.

When the gas byproducts G enter the second stage of the trap 30, the velocity of the gas byproducts G drops significantly due to the heat transfer from the gas byproducts G to the cooling coil tube 128, the hollow center tube 128, and the cones 146. Thus, a lower volume flow rate in the second stage than in the first stage is expected. The volume flow rate is also reduced to the collection and accumulation of the condensable material in the trap 30. In addition, the density of the gas byproducts G increases significantly in the second stage of the trap 30 since the temperature of the gas has been decreased and the pressure in the trap 30 is approximately a constant, as shown by the ideal gas law, $P = \rho RT$, where P is the pressure of the gas byproducts G, $\rho$ is the density of the gas byproducts G, R is a gas constant approximately equal to 8.314 J/(molK), and T is the temperature of the gas byproducts G measured in degrees kelvin. Since the volume of the second stage of the trap 30 is significantly less than the volume of the first stage of the trap, as shown by equations (2) and (3), the flow of the gas byproducts G through the second stage of the trap 30 is not significantly impeded and the flow conductance of the trap 30 at the exit port 34 is approximately equal to the flow conductance of the trap 30 at the entrance port 32. Due to the valving or obstructing effect of the cones 146, the cones 146 do tend to reduce the flow conductance of the second stage of the trap 30 and the flow of the gas byproducts G through the second stage of the trap 30. The holes 152 in the cones 146, however, significantly reduce the effect of the cones 146 on the flow of the gas byproducts G through the second stage of the trap 30.

During operation and use of the trap 30, the gas byproducts G enter the trap 30 through the entrance port 32 from a piping line segment such as the piping line segment 46 shown in FIG. 2. The gas byproducts G flow into the first stage volume 82 comprising all of the hollow interior of the main housing 60 except for the volume of the main housing 60 contained within the cylindrical sleeve 94. The temperature of the gas byproducts G at the entrance port 32 of the trap 30 can be, for example, one hundred fifty degrees celsius (150° C.). Due to some turbulence of the gas byproducts G that enter the trap 30, it is difficult, if not impossible, to predict the exact flow of all of the molecules of condensable vapor in the gas byproducts G inside the trap 30. A significant portion of the molecules of condensable vapor in the gas byproducts G will impact the outside surface 92 of the cylindrical sleeve 94, which creates a heat transfer between the molecules and the outside surface 92 of the cylindrical sleeve 94, thus reducing the temperature of the gas byproducts G, which in turn causes the molecules to condense on the outside surface 92 of the cylindrical sleeve 94. As the condensed material begins to build up and form a layer on the outside surface 92 of the cylindrical sleeve 94, other molecules of the condensable vapor in the gas byproducts G will impact the layer of condensed material, thereby increasing and continuing the buildup and accumulation of the layer of condensed material on the outside surface 92 of the cylindrical sleeve 94.

Some of the molecules of the condensable vapor in the gas byproducts G will not impact the outside surface 92 of the cylindrical sleeve 94 or the accumulated layer of condensed material on the outside surface 92 of the cylindrical sleeve 94. Instead, these molecules will flow around the cylindrical sleeve 94 and will either impact either the inner surface 106 of the main housing 60, thereby condensing, or will flow downward toward the base plate 74 or upward toward the top inner surface 164 of the main housing 60. It should be noted that the main housing 60 can also contribute large amounts of cooling for the first stage since the main housing 60 is cooled by ambient air and since the condensable vapor in the gas byproducts G will often solidify at a temperature that is higher than the ambient temperature.

A portion of the molecules of condensable vapor in the gas byproducts G that flow into the trap 30 and flow toward the top inner surface 164 of the main housing 60 will impact, condense, and accumulate along the top inner surface 164 of the main housing 60. Other molecules will be directed toward the portion 166 of the inner surface 106 of the main housing 60 between the top inner surface 164 of the main housing and the interior end 102 of the entrance port extension 62, thereby impacting, condensing, and accumulating on the portion 166 of the inner surface 106 of the main housing 60.

A portion (approximately five percent (5%) or even less) of the molecules of condensable vapor in the gas byproducts G that flow into the trap 30 will not be condensed in the first stage 80 of the trap 30 and will flow toward the base plate 74. Before the flowing gas byproducts G enter the second stage 112 of the trap 30, these gas byproducts 94 undergo abrupt changes of flow direction. For example, these molecules of condensable vapor in the gas byproducts G flowing into the trap 30 through the entrance port 32 and the entrance port extension 62 may first undergo a ninety degree (90°) change in flow direction so that some of the gas byproducts G molecules flow downwardly toward the base plate 74 of the trap 30. These molecules of condensable vapor in the gas byproducts G may then undergo a one-hundred eighty degree (180°) change of direction so that they can flow into and through the hollow interior of the cylindrical sleeve 94. The abrupt changes in the gas flow direction causes many of these molecules of the condensable vapor in the gas byproducts G to impact the base plate 74 or to impact an accumulated layer of condensed material on the base plate 74, which results in a very efficient heat transfer between the base plate 74 of the trap 30 and the molecules of the condensable vapor, thereby increasing the efficiency of the first stage of the trap 30 and reducing the load for the second stage of the trap 30. Since the base plate 74 is in physical contact with both of the cylindrical pipes 76, 78, the base plate is cooled by the liquid flowing through the cylindrical pipes 76, 78.

The gas byproducts G entering the second stage of the trap 30 can have a temperature between, for example sixty degrees celsius (60° C.) and one hundred degrees celsius (100° C.), and will flow into the hollow interior of the cylindrical sleeve 94 and upward toward the exit port 34 of the trap 30 on both sides of the cooling coil tube 120. Specifically, the gas byproducts G can flow either through the cones 146 or through the gap 108 between the cooling coil tube 120 and the cylindrical sleeve 94. The molecules of the condensable vapor in the gas byproducts G impact the cylindrical sleeve 94, the cooling coil tube 120, the center tube 128, and the cones 146, thereby condensing and accumulating on the impacted surface and increasing the efficiency of the trap 30.

As previously discussed, the second stage of the trap 30 acts as a very efficient heat exchanger in order to increase the scrubbing efficiency of the second stage of the trap 30, i.e., the ability of the second stage to collect and trap virtually all of the targeted condensable gas that remains in the gas byproduct G flow that was not removed in the first stage, and thereby increase the over all trapping efficiency of the entire trap 30. Therefore, a cooling fluid such as, for example, water at a temperature of in a range of approximately five degrees celsius (5° C.) to twenty-five degrees celsius (25° C.), is pumped at a rate of approximately five hundred cubic centimeters per minute (500 cm$^3$/min) into the cylindrical pipe 76 or, alternatively, into the cylindrical pipe 78. The cooling fluid flows through the cylindrical pipes 76, 78, the cooling coil tube 120, the curved portions 122, 126, and the hollow center tube 128 to cool the second stage of the trap 30. Since the cones 146 are connected to the cooling coil tube 120 and to the hollow center tube 128, the cones 146 are cooled by the cooling fluid flowing through the second stage of the trap 30. If the cooling fluid flows into the trap 30 through the cylindrical pipe 76, the cooling fluid will flow out of the trap 30 through the cylindrical pipe 78. Similarly, if the cooling fluid flows into the trap 30 through the cylindrical pipe 78, the cooling fluid will flow out of the trap 30 through the cylindrical pipe 76.

The gas byproducts G flowing through the second stage of the trap 30 will exit the trap 30 through the exit port 34 and enter a piping line segment, such as the piping line segment or pipe 54 shown in FIG. 2. As previously discussed, the trap 30 of the present invention can remove over ninety-nine percent (99%) of the condensable vapor in the gas byproducts G flowing through the trap 30. The pressure drop between the entrance port 32 of the trap 30 and the exit port 34 of the trap 30 will be approximately 2.7 millitorr when the mean pressure in the trap 30 is 190 millitorr and the mass flow rate Q of the gas byproducts G is approximately 120 standard cubic centimeters per minute (120 sccm). The temperature of the gas byproducts G exiting the trap 30 can be, for example, between twenty-five degrees celsius (25° C.) and thirty degrees celsius (30° C.). Eventually, the accumulation of the condensed material in the trap 30 will clog the trap 30 and reduce the flow conductance of the trap to a level where the trap 30 must be cleaned. If the trap 30 is used intermittently, the intermittent use will cause the condensed material in the trap 30 to revaporize, redistribute, and recondense in the trap 30 so that the distribution of the condensed material in the trap 30 will be more even, thereby increasing the time duration between required cleanings of the trap 30.

When cleaning the trap 30, the trap 30 is preferably, but not necessarily, removed from the piping line segments 46, 54 shown in FIG. 2. The base plate 74 can be removed from the main housing 60 of the trap to facilitate the cleaning process. There are many different ways to clean the trap 30, depending on what type of condensable material is to be removed from the trap 30. In the example of ammonium chloride ($NH_4Cl$) described above, a common and efficient method to remove the condensed ammonium chloride ($NH_4Cl$) in the trap 30 is to submerge the trap 30 into a water bath, since ammonium chloride ($NH_4Cl$) is soluble in water. Since the solubility of ammonium chloride ($NH_4Cl$) in water is a function of the water's temperature, a higher water temperature will result in a shorter cleaning time. Since hydrochloric acid is generated during the dissolving of ammonium chloride ($NH_4Cl$) in water, however, only lukewarm water rather than hot water should be used to dissolve the ammonium chloride ($NH_4Cl$) deposited in the trap 30. After the trap 30 is cleaned by water, the trap 30 can be placed into an oven (not shown) to remove any water vapor absorbed by the trap 30 or by the O-ring 75. The oven temperature should not be too high, however, or the O-ring 75 might be destroyed or damaged when the trap 30 is placed into the oven.

Figure 15:
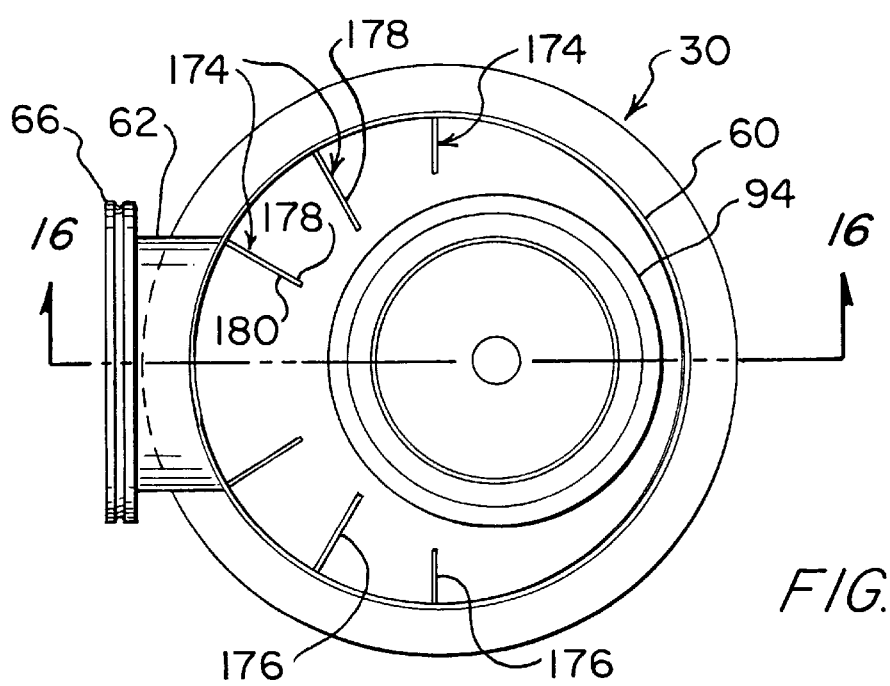
FIG. 15 is a cross-sectional view similar to FIG. 12 but showing a third embodiment of the trap, wherein main housing of the trap includes fins extending radially inward from the inner surface of the main housing of the trap.

Another embodiment of the trap 30 of the present invention is shown in FIG. 15. In this embodiment, the main housing 60 of the trap 30 includes the fins 174 (also shown in FIG. 13) to increase the number of impact surfaces upon which the molecules of condensable vapor in the gas byproducts G can physically impact or collide, thereby causing heat transfer from the molecules to the trap 30, which causes the molecules to condense in the trap 30, thereby improving the efficiency of the trap 30. The fins 174 extend radially inward from the inner surface 106 of the main housing 60 partially toward the longitudinal axis 100 of the main housing 60. Each of the fins 174 includes a downward sloping upper edge 176, and they each provide additional impact surfaces 178, 180 in the first stage of the trap 30 upon which the molecules of condensable vapor in the gas byproducts G can impact, condense, and accumulate, thereby increasing the efficiency of the first stage of the trap 30, increasing the usable volume of the trap 30, reducing the load for the second stage of the trap 30, and helping to optimize the deposition profile of the condensable vapor in the trap 30. The downward sloping upper edge 176 of each fin 174 helps prevent accumulation of condensed material too close to the entrance port extension 62 of the trap 30, which could cause premature clogging of the trap 30.

In order to increase the number of impact surfaces in the first stage even further and to help optimize the deposition profile of the condensable vapor in the trap 30, additional fins (not shown) can extend inwardly from the inner surface 106 of the main housing 60 in vertical, horizontal, or angled directions. The additional fins will provide additional impact surfaces in the trap 30 upon which the molecules of condensable vapor in the gas byproducts G can impact, condense, and accumulate. In addition, the fins 174 can also include smaller fins (not shown) extending outwardly from the surfaces 176, 178 in order to increase the number of surface areas in the first stage of the trap 30. It is also possible to have a fin (not shown) extending all the way from the inner surface 106 of the main housing 60 to the cylindrical sleeve 94, which can increase the amount of impact surface area significantly without reducing the useful volume of the first stage of the trap 30, if the fin (not shown) is placed near the rear inside surface 96 of the main housing 60 of the trap 30. Such a fin (not shown) could extend all the way from the base flange 70 of the main housing 60 to the top inner surface 164 of the main housing 60, since there would be little possibility of clogging the entrance port extension 62 by build-up or accumulation of condensed material at the rear inner surface 96 of the main housing 60.

Figure 16:
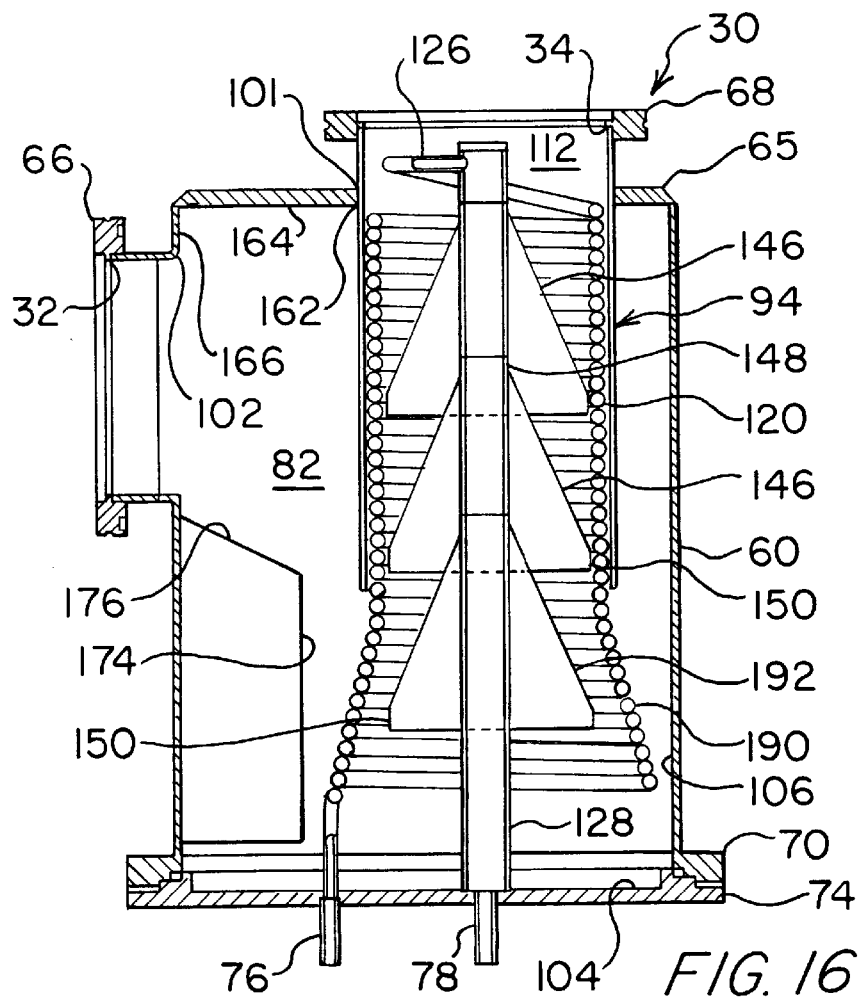
FIG. 16 is a cross-sectional view similar to FIG. 11, but showing a fourth embodiment of the trap that includes the fins similar to those in the third embodiment of FIG. 14, but with a different configuration of the cooling coil tube and the cylindrical sleeve.

Another embodiment of the trap 30 of the present invention is shown in FIG. 16. In this embodiment, the cylindrical sleeve 94 does not cover a significant portion 190 of the cooling coil tube 120. In addition, the cooling coil tube 120 is arranged as a hollow cylinder within the cylindrical sleeve 94 and as a hollow conical frustum in the interior portion of the main housing 60 falling outside the cylindrical sleeve 94. The cone 192 is attached to the center tube 128 so that it does not necessarily make physical contact (although it can) with the cooling coil tube 120 or the exposed portion 190 of the cooling coil tube 120. In this embodiment, the exposed portion 190 of the cooling coil tube 120 increases the heat transfer between the molecules of condensable vapor in the gas byproducts G and the trap 30 in the first stage of the trap 30, thereby increasing the efficiency of the first stage of the trap 30 and reducing the load on the second stage of the trap 30. The exposed portion 190 can also be viewed as a third stage of the trap 30 or as a transition zone between the first and second stages of the trap 30, much like the trap discussed above in relation to FIG. 5, graph (B). Other arrangements of the cooling coil tube 120 can also be used to optimize the efficiency and capacity of the trap 30 as well as the deposition profile in the trap 30. In addition, it is also possible for the lower cone 192 to have a different shape and/or dimensions that the cones 146 in order to optimize the efficiency and capacity of the trap 30 as well as the deposition profile in the trap 30.

The foregoing description is considered as illustrative only of the principles of the invention. Furthermore, since numerous modifications and changes will readily occur to those skilled in the art, it is not desired to limit the invention to the exact construction and process shown and described above. For example, the exact delineation between stages and/or transition zones in the trap and hence, the exact number of stages and transition zones in the trap 30 is subject to interpretation. For example, it is possible for the entrance port extension 62 to be considered a separate stage from the volume 82 in the main housing. It is also possible for the exit port extension 64 to be considered a separate stage from the volume contained within the cylindrical sleeve 94. As another example, the embodiments of the trap 30 discussed above in relation to FIGS. 15 and 16 can be considered to have two stages. Alternatively, however, the area of the trap 30 containing the fins 174 and the exposed cone 192 can also be considered to be a third stage or a transition zone between the first stage and the second stage.

As another example of how the trap 30 of the present invention can be used, it is possible to use the trap 30 as a planned scrubber to obtain a desired efficiency of particulate or condensable material removal from gas byproducts G flowing through the trap 30. In other words, while the trap 30 has been designed to have a large efficiency so that it will trap, collect, and accumulate a very large percentage of the condensable material in the gas byproducts G flowing through the trap 30, it is also possible to create a trap 30 having an efficiency of, for example, fifty percent (50%) by controlling, for example, the number of cones (and the number and size of the perforations in the cones), fins, and other impact or collision surfaces within the trap 30 and/or by controlling the temperature drop of the gas byproducts G by controlling, for example, the temperature of the fluid flowing through the cooling coil tube 120 and the temperature of the trap 30 at the entrance port 32, the exit port 34, the entrance port extension 62, the exit port extension 64, the flange 66, the flange 68, or the entire trap 30 through the use of heaters, insulators, and additional cooling coils.

The exact number of stages or zones in the trap 30 and the delineation between adjacent stages or zones is primarily useful in describing the construction and operation of a trap, but they should not be used to limit the scope of the concept behind the trap 30 of the present invention regarding the relationship between the deposition profile of the condensed material in the trap 30, the temperature profile of the trap 30, and the physical geometry of the trap 30. Accordingly, all suitable modifications and equivalents may be resorted to falling within the scope of the invention as defined by the claims which follow.

The embodiments of the invention in which an exclusive property or privilege is claimed are defined as follows:

1. In a trap for deposition of a material in a gas stream, said trap having an entrance for said gas stream and an exit for said gas stream wherein said gas enters said trap through said entrance at a first temperature and exits said trap through said exit at a second temperature that is lower than said first temperature such that there is a temperature drop of said gas stream in said trap between said entrance and said exit that results from transfer of energy from said gas stream to the trap and causes deposition of said material in said trap, the improvement comprising:

a first elongated and generally cylindrical housing substantially enclosing a primary chamber and a second elongated and generally cylindrical housing substantially enclosing a scrubber chamber, wherein said entrance directs said gas stream into said primary chamber and said second housing is positioned in and substantially surrounded by said primary chamber such that said first housing is eccentric to said second housing, such that said second housing forms a first impact surface for the gas stream entering said primary chamber through said entrance, and such that a substantially unimpeded flow path between said entrance and said first impact surface exists for said gas stream entering said primary chamber through said entrance, further wherein said scrubber chamber has an inlet in said primary chamber through which said gas stream enters said scrubber chamber and an outlet in gas flow relation with said exit, a second impact surface positioned between said inlet and said outlet of said scrubber chamber, and cooling means connected to said second impact surface for maintaining said second impact surface at a temperature lower than said first temperature.

2. The improvement of claim 1, wherein said second housing has a longitudinal axis and said second impact surface comprises a perforated cone with a conical axis that substantially coincides with said longitudinal axis of said second housing.

3. The improvement of claim 1, wherein said second housing has a longitudinal axis and said second impact surface comprises a plurality of perforated cones spaced apart from each other along said longitudinal axis of said second housing.

4. The improvement of claim 1, wherein said second impact surface comprises a plurality of fins shaped to alter said gas stream's flow direction when said gas stream impacts said second impact surface.

5. The improvement of claim 1, wherein said cooling means includes an axial tube extending longitudinally in said scrubber chamber substantially parallel to said longitudinal axis of said scrubber chamber, said axial tube being adapted for connection to a source of cooling fluid.

6. The improvement of claim 5, wherein said second impact surface comprises a perforated cone that is attached to and extends radially outward from said axial tube.

7. The improvement of claim 5, wherein said second housing has a longitudinal axis and said second impact surface comprises a plurality of perforated cones spaced apart from each other along said longitudinal axis of said second housing, each of said perforated cones being attached to and extending radially outward from said axial tube.

8. The improvement of claim 5, wherein said second impact surface comprises plurality of fins attached to and extending radially outward from said axial tube.

9. The improvement of claim 5, wherein said cooling means also includes a coiled tube connected to said axial tube and extending spirally through said scrubber chamber a radial distance outward from said axial tube.

10. The improvement of claim 9, wherein said second impact surface comprises a perforated cone attached to and extending radially outward from said axial tube toward said coiled tube.

11. The improvement of claim 10, wherein said cone extends into contact with said coiled tube.

12. The improvement of claim 9, wherein said second housing has a longitudinal axis and said second impact surface comprises a plurality of perforated cones spaced apart from each other along said longitudinal axis of said second housing, each of said perforated cones being attached to and extending radially outward from said axial tube toward said coiled tube.

13. The improvement of claim 12, wherein said cones extend into contact with said coiled tube.

14. The improvement of claim 9, wherein said second impact surface comprises a plurality of fins attached to and extending radially outward from said axial tube toward said coiled tube.

15. The improvement of claim 14, wherein said fins extend into contact with said coiled tube.

16. The improvement of claim 1, wherein said scrubber chamber and said second impact surface in said scrubber chamber are sized, proportioned, and oriented in relation to each other in such a manner that conductance of the gas stream in said scrubber chamber is not less than conductance of the gas stream at the entrance of the trap.

17. The improvement of claim 1, wherein one end of said second elongated and generally cylindrical housing is positioned in said primary chamber and forms said inlet and the opposite end of said second elongated and generally cylindrical housing is positioned outside said primary chamber and forms said exit of the trap.

18. The improvement of claim 17, wherein said second elongated and generally cylindrical housing is positioned in said primary chamber such that said gas stream flows from said inlet of said second housing to said exit of said trap.

19. The improvement of claim 18, wherein said entrance to the trap is oriented in relation to said primary chamber in a manner that directs said gas stream into said primary chamber in an initial flow direction and said second housing is oriented in relation to said entrance in a manner that directs said flow of said gas stream from said inlet of said second housing to said exit of said trap in a direction substantially perpendicular to said initial flow direction of said gas stream entering said primary chamber through said entrance to the trap.

20. The improvement of claim 19, wherein one end of said first housing has a full end wall that is spaced a distance away from said inlet and the opposite end of said first housing has a partial end wall that seals to said second housing.

21. The improvement of claim 1, wherein said entrance is positioned in said outer cylinder of said first housing such that said entrance is positioned on said outer cylinder of said first housing as far as possible from said longitudinal axis of said second housing.

22. The improvement of claim 1, wherein said primary chamber has a primary volume, and said scrubber chamber has a secondary volume that is smaller than said primary volume.

23. The improvement of claim 22, wherein said primary volume is at least one and one-half times larger than the secondary volume.

24. The improvement of claim 1, wherein said inlet to said scrubber chamber has cross-sectional area and said entrance to said trap has a cross-sectional area, and said cross-sectional area of said inlet is greater than or equal to said cross-sectional area of said entrance multiplied by said first temperature and divided by said second temperature.

25. The improvement if claim 1, wherein said first generally cylindrical housing has an inner surface and at least one housing impact surface extending inward from said inner surface of said first generally cylindrical housing.

26. The improvement of claim 25, wherein said housing impact surface includes a fin.

27. The improvement of claim 1, wherein said inlet of said second housing is coaxial with said outlet of said second housing.

28. The improvement of claim 27, wherein said inlet of said second housing is not co-axial with said entrance to said trap.

29. The improvement of claim 27, wherein said outlet of said second housing is not co-axial with said entrance to said trap.

30. A trap through which a gas stream may flow and capable of collecting material created by condensation of a gas or gases in the gas stream while the gas stream is flowing through the trap, said gas stream entering said trap at an initial temperature, comprising:

a first housing substantially enclosing a primary chamber, said first housing having an entrance through which said gas stream flows into said primary chamber substantially in an initial flow direction, said primary chamber having a first impact surface distinct from said first housing contained within said first housing, said impact surface being positioned at a distance spaced apart from said entrance and shaped such that substantially all of said gas stream entering said primary chamber will either impact and deposit on said first impact surface or be diverted away from said initial flow direction by said impact surface, said distance being substantially empty such that gas flow through said distance is substantially uninterrupted and said primary chamber's capacity for deposition and buildup of condensed solid material in said primary chamber is substantially optimized;

a second housing substantially enclosing a secondary chamber, said second housing having an inlet in said primary chamber such that said gas stream flows from said primary chamber through said inlet into said secondary chamber and an outlet through which said gas stream exits said second housing and the trap, said inlet and said outlet of said secondary chamber being distinct from said entrance in said first housing, wherein said second housing extends into said primary chamber and said secondary chamber includes a secondary impact surface distinct from said second housing and positioned within said secondary chamber and shaped such that substantially all of the gas stream entering and flowing through the secondary chamber either impacts and deposits on said secondary impact surface or is diverted in gas flow direction by said secondary impact surface, further wherein said secondary chamber includes cooling means connected to said secondary impact surface for maintaining said secondary impact surface at a temperature lower than the initial temperature of said gas stream entering the trap.

31. The trap of claim 30, wherein said second housing is an elongated cylinder with a longitudinal axis.

32. The trap of claim 31, wherein said secondary impact surface includes a perforated cone with a conical axis that substantially coincides with said longitudinal axis of said second housing.

33. The trap of claim 31, wherein said secondary impact surface includes a plurality of fins shaped to divert said gas stream flow direction when said gas stream flows through said secondary chamber.

34. The trap of claim 31, wherein said cooling means includes an axial tube extending longitudinally in said secondary chamber substantially parallel to said longitudinal axis of said second housing, said tube being adapted for connection to a source of cooling fluid.

35. The trap of claim 34, wherein said secondary impact surface includes a perforated cone that is attached to and extends radially outward from said axial tube.

36. The trap of claim 34, wherein said secondary impact surface includes a plurality of fins attached to and extending radially outward from said axial tube.

37. The trap of claim 34, wherein said cooling means also includes a coiled tube connected to said axial tube and extending spirally through said secondary chamber adjacent said cylinder and a radial distance outward from said axial tube.

38. The trap of claim 37, wherein said secondary impact surface includes a perforated cone attached to and extending radially outward from said axial tube toward said coiled tube.

39. The trap of claim 37, wherein said secondary impact surface includes a plurality of fins attached to and extending radially outward from said axial tube toward said coiled tube.

40. The trap of claim 31, wherein said second housing is positioned in and substantially surrounded by said primary chamber.

41. The trap of claim 40, wherein said first housing is an elongated outer cylinder that substantially surrounds said second housing, one end of which outer cylinder has a full end wall that is spaced a distance away from said inlet and the opposite end of which outer cylinder has a partial end wall that seals to said second housing.

42. The trap of claim 41, wherein said elongated outer cylinder of said first housing is eccentric to said elongated cylinder of said second housing.

43. The trap of claim 30, wherein said inlet of said second housing is co-axial with said outlet of said second housing.

44. The improvement of claim 43, wherein said inlet of said second housing is not co-axial with said entrance of said first housing.

45. The improvement of claim 43, wherein said outlet of said second housing is not co-axial with said entrance of said first housing.

46. A trap for deposition of material in a gas stream having an entrance for the gas stream and an exit for the gas stream, wherein the gas stream enters the trap at an initial temperature and exits the trap at a second temperature, comprising:

a first housing substantially enclosing a primary chamber and a second housing substantially enclosing a secondary chamber, said first housing having an entrance through which said gas stream flows into said primary chamber substantially in an initial flow direction, said primary chamber having a first impact surface formed by said second housing and positioned such that a substantially unimpeded flow path exists for said gas stream entering said primary chamber through said entrance between said entrance and said first impact surface and positioned transverse to said initial flow direction of said gas stream and shaped to divert substantially all of said gas stream from said gas stream's initial flow direction except for molecules of said gas stream that impact and deposit on said first impact surface;

a second housing substantially enclosing a secondary chamber, said second housing having an inlet in said primary chamber such that said gas stream flows from said primary chamber through said inlet into said secondary chamber and an outlet through which said gas stream exits said second housing, said inlet and said outlet of said second housing being distinct from said entrance to the trap, wherein said second housing includes a secondary impact surface distinct from said second housing and positioned within said secondary chamber, further wherein said secondary chamber includes a cooling means connected to said secondary impact surface for maintaining said secondary impact surface at a temperature lower than the initial temperature of said gas stream entering the trap and positioned such that said cooling means does not substantially cool said first impact surface.

47. The trap of claim 46, wherein said second housing is an elongated cylinder with a longitudinal axis.

48. The trap of claim 47, wherein said secondary impact surface includes a perforated cone with a conical axis that substantially coincides with said longitudinal axis of said second housing.

49. The trap of claim 47, wherein said secondary impact surface includes a plurality of fins shaped to divert said gas stream flow direction when said gas stream flows through said secondary chamber.

50. The trap of claim 47, wherein said cooling means includes an axial tube extending longitudinally in said secondary chamber substantially parallel to said longitudinal axis of said second housing, said tube being adapted for connection to a source of cooling fluid.

51. The trap of claim 50, wherein said secondary impact surface includes a perforated cone that is attached to and extends radially outward from said axial tube.

52. The trap of claim 50, wherein said cooling means also includes a coiled tube connected to said axial tube and extending spirally through said secondary chamber adjacent said cylinder and a radial distance outward from said axial tube.

53. The trap of claim 47, wherein said second housing is positioned in and substantially surrounded by said primary chamber.

54. The trap of claim 53, wherein said first housing is an elongated outer cylinder that substantially surrounds said second housing, one end of which outer cylinder has a full end wall that is spaced a distance away from said inlet and the opposite end of which outer cylinder has a partial end wall that seals to said second housing.

55. The trap of claim 54, wherein said elongated outer cylinder of said first housing is eccentric to said elongated cylinder of said second housing.

56. The trap of claim 46, wherein said first impact surface includes said second housing.

57. The trap of claim 46, wherein said first housing has an inner surface and at least one housing impact surface extending away from said inner surface of said first housing.

58. The trap of claim 57, wherein said housing impact surface includes a fin.

59. The trap of claim 54, wherein said elongated outer cylinder of said first housing has an inner surface and at least one housing impact surface extending inward from said inner surface of said elongated outer cylinder.

60. The trap of claim 59, wherein said housing impact surface includes a fin.

61. The trap of claim 46, wherein said inlet of said second housing is co-axial with said outlet of said second housing.

62. The improvement of claim 61, wherein said inlet of said second housing is not co-axial with said entrance of said first housing.

63. The improvement of claim 61, wherein said outlet of said second housing is not co-axial with said entrance of said first housing.

* * * * *